United States Patent
Jeong et al.

(10) Patent No.: US 9,811,433 B2
(45) Date of Patent: Nov. 7, 2017

(54) USER-DIRECTED DIAGNOSTICS AND AUTO-CORRECTION

(71) Applicant: Oracle International Corporation, Redwood Shores, CA (US)

(72) Inventors: Chae Hun Jeong, Greenwood Village, CO (US); Christopher Bartlett Papineau, Centennial, CO (US); Pradip Kumar Pandey, Highlands Ranch, CO (US); Gurbinder Singh Bali, Highlands Ranch, CO (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 85 days.

(21) Appl. No.: 14/491,898

(22) Filed: Sep. 19, 2014

(65) Prior Publication Data

US 2015/0089270 A1    Mar. 26, 2015

Related U.S. Application Data

(60) Provisional application No. 61/880,460, filed on Sep. 20, 2013, provisional application No. 61/880,464, filed on Sep. 20, 2013.

(51) Int. Cl.
*G06F 11/26* (2006.01)
*G06F 11/22* (2006.01)
(Continued)

(52) U.S. Cl.
CPC ........ *G06F 11/2257* (2013.01); *G06F 11/079* (2013.01); *G06F 11/0709* (2013.01);
(Continued)

(58) Field of Classification Search
CPC .......................... G06F 11/263; G06F 11/2644
(Continued)

(56) References Cited

U.S. PATENT DOCUMENTS

| 6,895,578 B1 * | 5/2005 | Kolawa | G06F 11/3684 |
| | | | 714/E11.209 |
| 8,079,019 B2 * | 12/2011 | Lindo | G06F 11/0778 |
| | | | 711/132 |

(Continued)

OTHER PUBLICATIONS

Alex Savin, "Digging Tunnels", Red Badger, May 12, 2014, 7 pages.
(Continued)

*Primary Examiner* — Chae Ko
(74) *Attorney, Agent, or Firm* — Vista IP Law Group, LLP

(57) ABSTRACT

A method, system, and computer program product for performing user-initiated logging and auto-correction in hardware/software systems. Embodiments commence upon identifying a set of test points and respective instrumentation components, then determining logging capabilities of the instrumentation components. The nature and extent of the capabilities and configuration of the components aid in generating labels to describe the various logging capabilities. The labels are then used in a user interface so as to obtain user-configurable settings which are also used in determining auto-correction actions. A measurement taken at a testpoint may result in detection of an occurrence of a certain condition, and auto-correction steps can be taken by retrieving a rulebase comprising a set of conditions corresponding to one or more measurements, and corrective actions corresponding to the one or more conditions. Detection of a condition can automatically invoke any number of processes to apply a corrective action and/or emit a recommendation.

20 Claims, 30 Drawing Sheets

(51) Int. Cl.
  *G06F 11/07* (2006.01)
  *G06F 21/31* (2013.01)
  *G06F 21/62* (2013.01)
  *G06F 11/36* (2006.01)
  *H04L 12/24* (2006.01)
(52) U.S. Cl.
  CPC ...... *G06F 11/0766* (2013.01); *G06F 11/0793* (2013.01); *G06F 11/2268* (2013.01); *G06F 11/26* (2013.01); *G06F 11/366* (2013.01); *G06F 21/31* (2013.01); *G06F 21/629* (2013.01); *H04L 41/18* (2013.01); *H04L 41/20* (2013.01)
(58) Field of Classification Search
  USPC .......................................................... 714/35
  See application file for complete search history.

(56) References Cited

U.S. PATENT DOCUMENTS

| | | | |
|---|---|---|---|
| 8,578,340 B1 | 11/2013 | Daudel | |
| 2001/0021985 A1* | 9/2001 | Aldridge | G06F 11/3664 714/38.14 |
| 2002/0083371 A1* | 6/2002 | Ramanathan | G06F 11/2294 714/37 |
| 2003/0074650 A1* | 4/2003 | Akgul | G06F 11/3624 717/129 |
| 2004/0015866 A1* | 1/2004 | Estep | G06F 11/3684 717/124 |
| 2006/0064486 A1* | 3/2006 | Baron | H04L 41/0886 709/224 |
| 2006/0167643 A1* | 7/2006 | Casto | G01R 35/005 702/85 |
| 2006/0227714 A1 | 10/2006 | Griffin | |
| 2007/0088744 A1 | 4/2007 | Webber | |
| 2007/0113218 A1* | 5/2007 | Nolan | G06F 11/362 717/124 |
| 2008/0295078 A1* | 11/2008 | Stall | G06F 11/3664 717/125 |
| 2009/0249284 A1* | 10/2009 | Antosz | G06F 8/10 717/104 |
| 2010/0070776 A1 | 3/2010 | Raman | |
| 2010/0218044 A1* | 8/2010 | Roblett | H04L 43/50 714/32 |
| 2011/0047415 A1 | 2/2011 | Nanjundaswamy | |
| 2012/0084604 A1* | 4/2012 | Tamilio | G06F 11/2294 714/32 |
| 2012/0131555 A1 | 5/2012 | Hossain | |
| 2012/0151452 A1 | 6/2012 | Zinkovsky | |
| 2012/0222014 A1* | 8/2012 | Peretz | G06F 11/3688 717/125 |
| 2013/0007716 A1* | 1/2013 | Bates | G06F 11/362 717/125 |
| 2013/0007720 A1* | 1/2013 | Cai | G06F 11/3664 717/130 |
| 2013/0054792 A1* | 2/2013 | Sharaf | G06F 8/20 709/224 |
| 2013/0338958 A1* | 12/2013 | Shanishchara | G01C 25/00 702/116 |
| 2014/0075138 A1* | 3/2014 | Doster | G06F 11/3476 711/162 |
| 2014/0245074 A1* | 8/2014 | Duale | G06F 11/3644 714/45 |
| 2014/0331090 A1* | 11/2014 | Mohindra | G06F 11/3664 714/37 |
| 2015/0007145 A1* | 1/2015 | Pierce | G06F 11/3093 717/130 |
| 2015/0089304 A1 | 3/2015 | Jeong et al. | |

OTHER PUBLICATIONS

Non-final Office Action dated May 10, 2016 for related U.S. Appl. No. 14/491,894.
Final Office Action dated Oct. 20, 2016 for related U.S. Appl. No. 14/491,894.
Non-final Office Action dated Mar. 31, 2017 for related U.S. Appl. No. 14/491,894.
Notice of Allowance and Fee(s) due dated Jul. 28, 2017 for related U.S. Appl. No. 14/491,894.

* cited by examiner

Recycle Kernel

Select [Time of Day]:  [Delete]  [Add Time]

Select All | Select None

| Day of Week | Time of Day |
|---|---|
| ☐ Sunday | 03:30 (3:30 AM) |
| ☐ Every Day | 3:30 (3:30 AM) |

⊞ Elapsed Time Since Kernel Starts 830                                  ⋀ Return To Top You may also specify an elapsed time since the kernel process has started. For example, you may specify a kernel process should be recycled twelve hours after it started.

Elapsed Time Recycle 🗓 [2 weeks]

☑ If both elapsed time and time of day configurations are used, the kernel will be recycled using whichever provides the shortest time from when the kernel was started.

[Apply]

⊞ Recycle Timeouts 840                                                  ⋀ Return To Top Use the following to specify the threshold timeouts used to determine inactive user sessions and forced recycling. A kernel will not be recycled if there are active user sessions unless the forma exit threshold has been reached.

Inactive User Timeout 🗓 [6:00] # user sessions considered inactive  ← 842

Forced Exit Timeout 🗓 [12:00] # kernels forced to exit, if still running  ← 844

FIG. 8B

Connection Caches 850

Instance Name [den60207jems_JAS_8185 ▶]

[Submit Query]

☐ Pooled Database Connections 856

Shown below are the total number of connections for each logical datasource. This total number represents the sum of available pooled connections and the open connections that are currently in use.

| Connection URL | Web Server: den60207jems_JAS_8185 | Total |
|---|---|---|
| le91k_JDE | 50 | 50 |
| Total Connections | 50 | 50 |

USER-DIRECTED DIAGNOSTICS AND AUTO-CORRECTION

RELATED APPLICATIONS

The present application claims the benefit of priority to U.S. Patent Application Ser. No. 61/880,460, entitled "METHOD AND SYSTEM FOR IMPLEMENTING UNIFIED AND USER ORCHESTRATED LOGGING", filed Sep. 20, 2013; and the present application claims the benefit of priority to U.S. Patent Application Ser. No. 61/880,464, entitled "METHOD AND SYSTEM FOR IMPLEMENTING A CORRECTIVE ENGINE", filed Sep. 20, 2013, both of which are hereby incorporated by reference in their entirety.

The present application is related to co-pending U.S. patent application Ser. No. 14/491,894, entitled "USER-DIRECTED LOGGING AND AUTO-CORRECTION", filed on even date herewith, which is hereby incorporated by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

This disclosure relates to the field of logging, analysis and auto-correction in complex mixed hardware/software systems and more particularly to techniques for user-directed diagnostics and auto-correction.

BACKGROUND

Many types of business logic are implemented by enterprise software applications. For example, customer relationship management (CRM) applications often implement business logic to perform price quotations and order capture for customers. Enterprise resource planning (ERP) systems often comprise enterprise applications that are used to integrate management information from multiple different functions within an organization. Due to extensive usage by many organizations, these enterprise applications and their associated computing systems often become some of the most over-burdened and most-often used applications within the organization. As a result, it is not uncommon for these enterprise applications to sometimes suffer from availability and performance problems.

Improved analysis and user-controllable diagnostics configuration modules are needed so as to identify and address performance problems with many types of systems and software. Using legacy tools, developers, diagnostic engineers, and IT administrators are forced to spend a significant amount of time merely reproducing a reported problem— even before diagnosing the root cause of the problem.

Conventional tools are typically only available to be used by a special class of users on the system such developers, diagnostic engineers, IT administrators, and database administrators (DBAs). One reason for restricted access to legacy tools is because they tend to demand a high degree of technical skill, consume a significant amount of time to set up, and demand significant system resources. The manpower usage and system performance degradation involved in using legacy tools is very costly. As a result, ordinary users (e.g., users other than developers, diagnostic engineers, IT administrators, and DBAs) are not typically provided with sufficient access to tools to configure and invoke diagnostics and logging.

Unfortunately, problems observed by normal users (e.g., during normal production operation of the applications) might not be easy to reproduce by developers, diagnostic engineers, etc. Waiting for an administrator to start diagnostics/logging instead of allowing users to have that capability creates barriers to effective diagnosis of problems in the system, and can severely impact the organization, its businesses and its processing systems. Techniques are needed to facilitate user configuration of instrumentation, logging, and to facilitate user-directed problem reproduction, resolution and auto-correction.

None of the aforementioned legacy approaches achieve the capabilities of the herein-disclosed techniques for user-directed diagnostics and auto-correction. Therefore, there is a need for improvements.

SUMMARY

The present disclosure provides an improved method, system, and computer program product suited to address the aforementioned issues with legacy approaches. More specifically, the present disclosure provides a detailed description of techniques used in methods, systems, and computer program products for user-directed diagnostics and auto-correction. The claimed embodiments address the problem of configuring instrumentation for user-directed problem reproduction and resolution. More specifically, some claims are directed to approaches for providing user-level control of diagnostic configuration settings and providing user-level control of an auto-correction rules database, which claims advance the technical fields for addressing the problem of configuring instrumentation for user-directed problem reproduction and resolution, as well as advancing peripheral technical fields. Some claims improve the functioning of multiple systems within the disclosed environments.

Some user-initiated logging embodiments commence upon identifying a set of one or more test points in a system, the set of one or more test points having respective instrumentation components, then determining logging capabilities of the instrumentation components. The nature and extent of the capabilities and configuration of the components aid in generating labels to describe the various logging capabilities and their corresponding associated states. The labels are used in preparing a user interface so as to obtain user-configurable settings. The user-configurable logging settings are used in a debug mode that may include auto-correction upon detection of a particular condition.

Embodiments supporting auto-correction rely, at least in part, on the configuration of a set of instrumentation components determined from user-initiated logging specifications. An event at a testpoint or a measurement taken at a testpoint may result in detection of an occurrence of certain conditions. Auto-correction steps can be taken by retrieving a rulebase where the rulebase comprises a set of conditions corresponding to one or more measurements, and corrective actions corresponding to the one or more conditions. Detection of a condition can automatically invoke any number of processes to apply a corrective action and/or emit a recommendation.

Further details of aspects, objectives, and advantages of the disclosure are described below and in the detailed description, drawings, and claims. Both the foregoing general description of the background and the following detailed description are exemplary and explanatory, and are not intended to be limiting as to the scope of the claims.

BRIEF DESCRIPTION OF THE DRAWINGS

The drawings described below are for illustration purposes only. The drawings are not intended to limit the scope of the present disclosure.

FIG. 8B exemplifies a kernel recycle schedule configuration screen as used in systems supporting user-directed diagnostics and auto-correction, according to one embodiment.

FIG. 8C exemplifies a database connection cache configuration screen as used in systems supporting user-directed diagnostics and auto-correction, according to one embodiment.

DETAILED DESCRIPTION

Figure 1A:
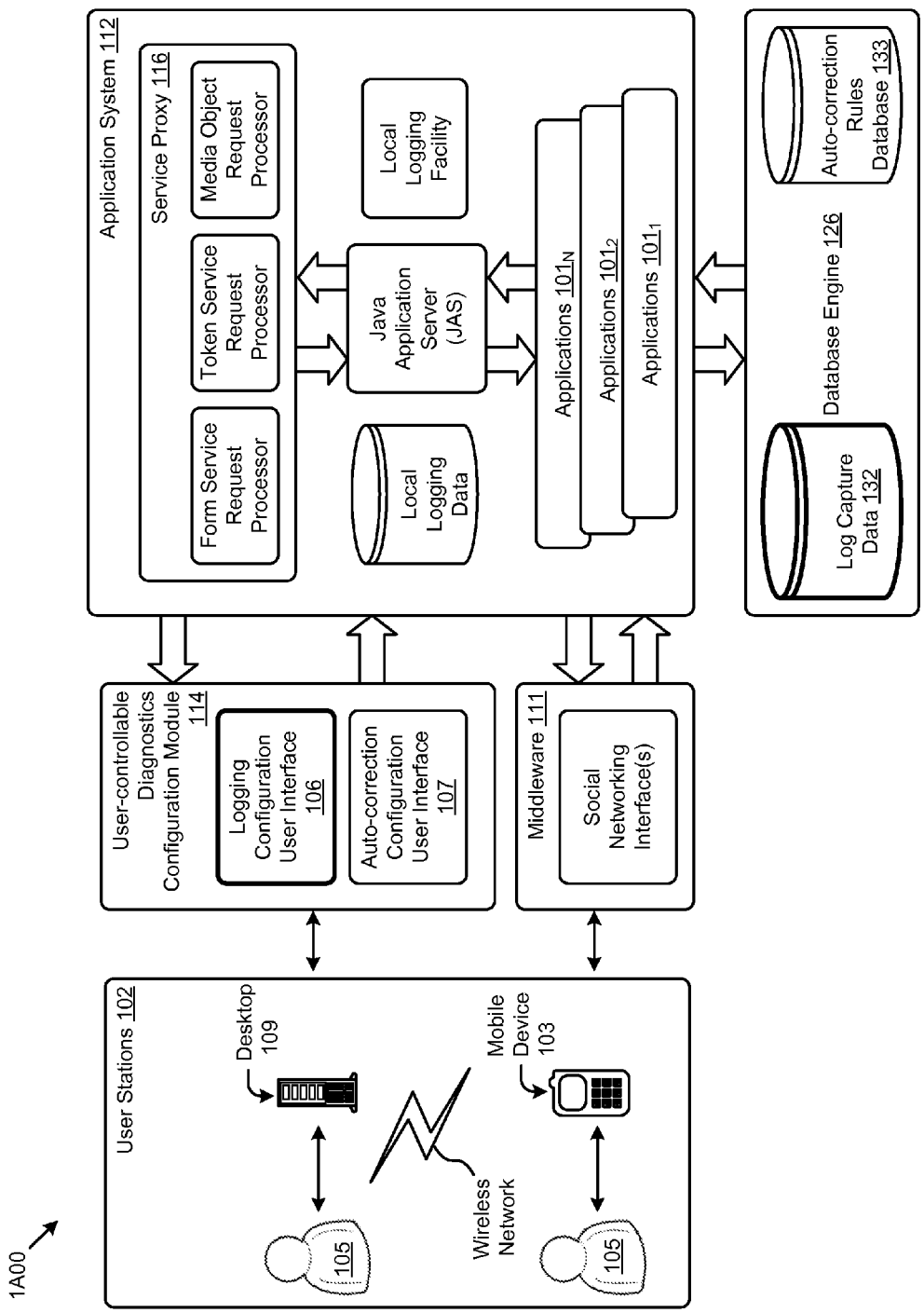
FIG. 1A exemplifies an environment for configuring user-directed diagnostics, according to one embodiment.

Some embodiments of the present disclosure address the problem of configuring instrumentation for user-directed problem reproduction and resolution and some embodiments are directed to approaches for providing user-level control of diagnostic configuration settings and providing user-level control of an auto-correction rules database. More particularly, disclosed herein and in the accompanying figures are exemplary environments, methods, and systems for user-directed diagnostics and auto-correction.

Overview

Enterprise application users (as distinguished from diagnostic engineers) often are the first to encounter problems in these complex mixed hardware/software systems. Often, a problem reporting and resolution procedure relies on the user being able to provide enough information so as to permit reproduction of the problem by a diagnostic engineer. Some enterprise application users are sufficiently technical that they can reproduce the conditions under which the problem can be observed again. However, sometimes the enterprise application user, while possibly an expert at using the enterprise application, does not have the technical skill or system observational abilities to reliably reproduce the observed problem. Discussed hereunder are improved approaches for user-orchestrated logging, debugging and auto-correction. The approach permits a debug mode to be used on a user-by-user basis, where the type and/or quantity of information to be logged can be configurably adjusted by a user.

Instead of limiting usage of diagnostic tools to only diagnostic engineers and system administrators, a panoply of diagnostic and auto-correction functions are user controllable and configurable. Pre-installed instrumentation and a comfortable user interface permits logging to be turned on by the user at the time that problems are suspected during regular operation. The type and amount of data to be tracked and logged is adjustable and a variety of debug modes can be selected and/or configured on a user-by-user basis. In many cases, fewer resources are required as compared to a system-wide logging approach. This results in lower memory/data footprint requirements for problem detection and resolution, and often yields a measurably lower impact to the overall system during operation in a debug mode.

Definitions

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

Descriptions of Exemplary Embodiments

FIG. 1A exemplifies an environment 1A00 for configuring user-directed diagnostics. As an option, one or more instances of environment 1A00 or any aspect thereof may be implemented in the context of the architecture and functionality of the embodiments described herein. Also, the environment 1A00 or any aspect thereof may be implemented in any desired environment.

As shown in FIG. 1A, the environment includes one or more users (e.g., user 105) situated at one or more user stations 102. The users access the system to operate and interact with an application system 112. The user stations comprise any type or types of computing station equipment (e.g., a desktop 109, a mobile device 103, workstations, personal computers, or remote computing terminals, etc.) that may be used to operate or interface with the enterprise applications (e.g., application $101_1$, application $101_2$, application $101_N$, etc.). The user station comprises a display device, such as a display monitor or mobile device screen, for displaying a user interface to users at the user station. The user station also comprises one or more input devices for the user to provide operational control over the activities of systems within environment 1A00. Such input devices include a mouse or keyboard and can be used to manipulate a pointing object in a graphical user interface and/or to generate user inputs to the enterprise application and/or social networking applications.

The enterprise applications comprise any business and/or marketing related set of functionality that is accessible to users at the user station 102. Such enterprise/business applications can include, without limitation, customer relations management (CRM) applications, enterprise resource planning (ERP) applications, supply chain management applications, and other applications dealing with various finance, accounting, manufacturing, human resources, and/or distribution functions, etc.

A user-controllable diagnostics configuration module 114 is operable by the user at user station 102 to track the operations of and/or between any modules of the system within environment 1A00. Strictly as one example, the operations of the application system 112 and/or a service proxy 116 and/or the middleware 111 and/or the database engine and/or any enterprise applications 101 can be monitored and the occurrence of and timing of events can be logged. For example, while enterprise applications are operating, possibly involving communication with any other modules of the system, log capture data 132 can be generated and stored by a database engine 126 (e.g., within a file or table containing log capture data 132).

The log capture data 132 and/or any other data may be stored in a computer readable storage device disposed within or accessible to the database engine 126. Such a computer readable storage device may comprise any combination of hardware and/or software that allows for ready access to the data that is located at the computer readable storage device. For example, the computer readable storage device could be implemented as computer memory operatively managed by an operating system. The computer readable storage device could also be implemented in any system having storage on persistent and/or non-persistent forms.

The shown user-controllable diagnostics configuration module 114 comprises a logging configuration user interface 106 that serves to accept input from a user. Various embodiments of such a user interface are discussed below.

In addition to supporting a logging configuration user interface 106, the disclosed embodiments support user-level configuration and control of auto-correction rules through use of the shown auto-correction configuration user interface 107. Measurements, conditions, and remedial action can be taken automatically by the user-controllable diagnostics configuration module 114 or in conjunction with any module accessible to the user-controllable diagnostics configuration module 114. For example, the user-controllable diagnostics configuration module 114 might detect the presence of a condition as described in a rulebase (e.g., in an auto-correction rules database 133), and might fire a rule, for example, to initiate local logging by the JAS Java Application Server using the JAS server's local logging facility. Myriad other logging and auto-correction possibilities exist, as are discussed hereunder.

Figure 1B:
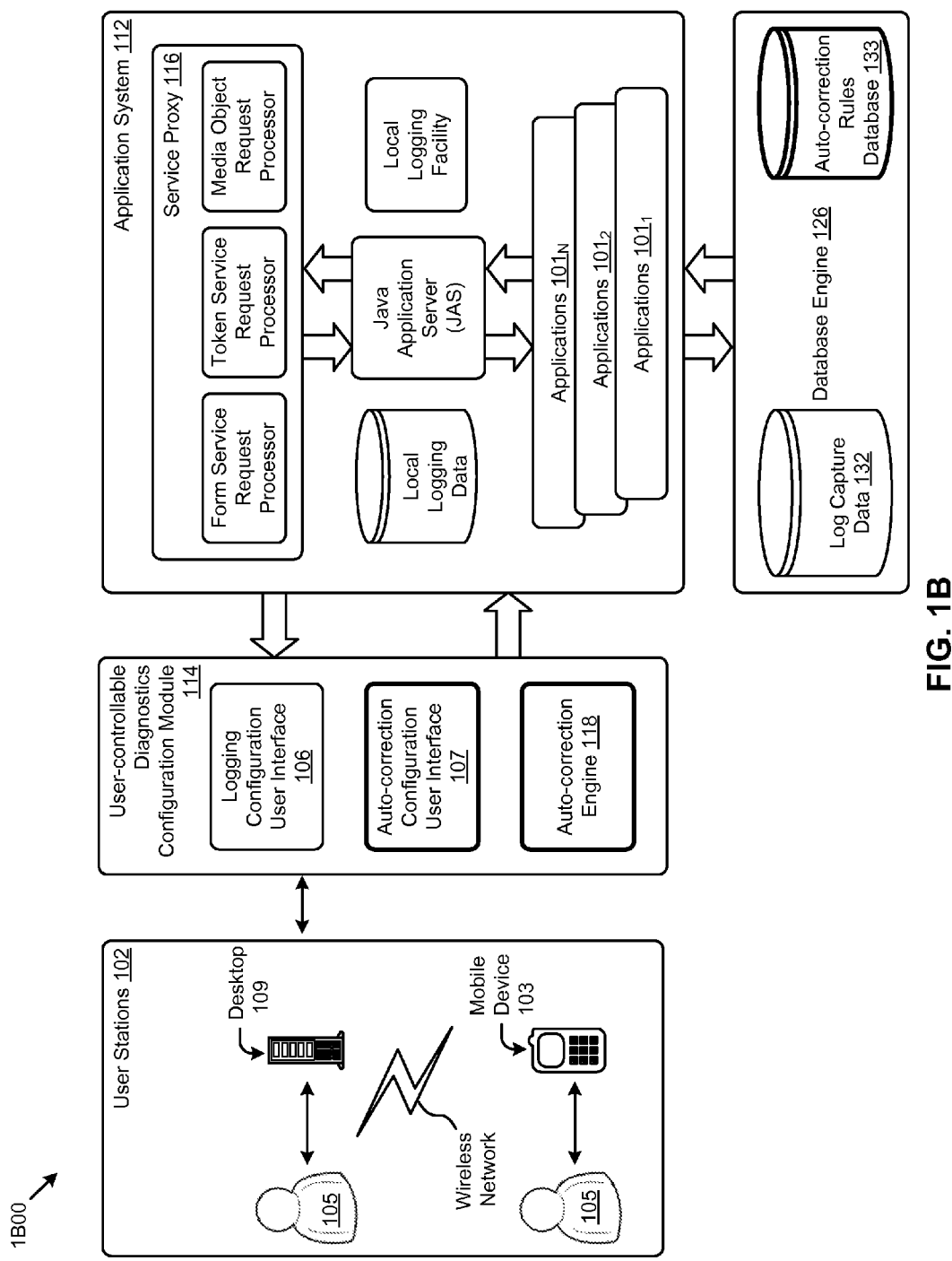
FIG. 1B exemplifies an environment for configuring user-directed auto-correction, according to one embodiment.

FIG. 1B exemplifies an environment 1B00 for configuring user-directed auto-correction. As an option, one or more instances of environment 1B00 or any aspect thereof may be implemented in the context of the architecture and functionality of the embodiments described herein. Also, the environment 1B00 or any aspect thereof may be implemented in any desired environment.

As discussed above, analysis and user-controllable diagnostics configuration modules can be used to identify and address functional and performance problems with many types of systems and software. In addition to providing measurement or monitoring capabilities as heretofore discussed, a knowledgebase of corrective actions may also be provided. Such a knowledgebase (e.g., auto-correction rules database 133) can be employed to address problems that are identified by the measurement or monitoring capabilities.

It is desirable to allow the users and/or administrators in the system to be able to update the knowledgebase. Some embodiments disclosed herein employ one or more user interfaces to facilitate user definition of measurements, conditions and corrective actions. An auto-correction engine 118 is operable to automatically correct identified problems in the system. The rulebase (e.g., auto-correction rules database 133) used by the auto-correction engine is configurable by users and/or administrators of the system. This ability to update the rulebase advantageously allows for evolution and extensibility of the auto-correction engine. Further, the auto-correction engine is operable to automatically correct identified problems in the system. The rulebase used by the auto-correction engine is configurable by users and/or administrators of the system. This ability to update the rulebase advantageously allows for evolution and extensibility of the auto-correction engine.

Health Monitoring

The user-controllable diagnostics configuration module 114 is operable to monitor the state and health of the enterprise applications. The user-controllable diagnostics configuration module incorporates and/or is associated with an auto-correction engine 118. The auto-correction engine 118 includes functionality to identify and make corrections for problems including performance problems that are identified as pertaining to the overall system and/or pertaining to the enterprise applications and/or to any communication links of the system.

The auto-correction engine 118 functions by accessing and maintaining an auto-correction rules database 133. The auto-correction rules database 133 comprises a database of rules that identify the circumstances and/or measured conditions under which auto-corrective actions should be taken. The auto-correction engine 118 comprises a rules processing engine that is capable of accessing and using the rules within the auto-correction rules database 133.

The auto-correction rules database 133 may be stored in a computer readable storage device.

Figure 2:
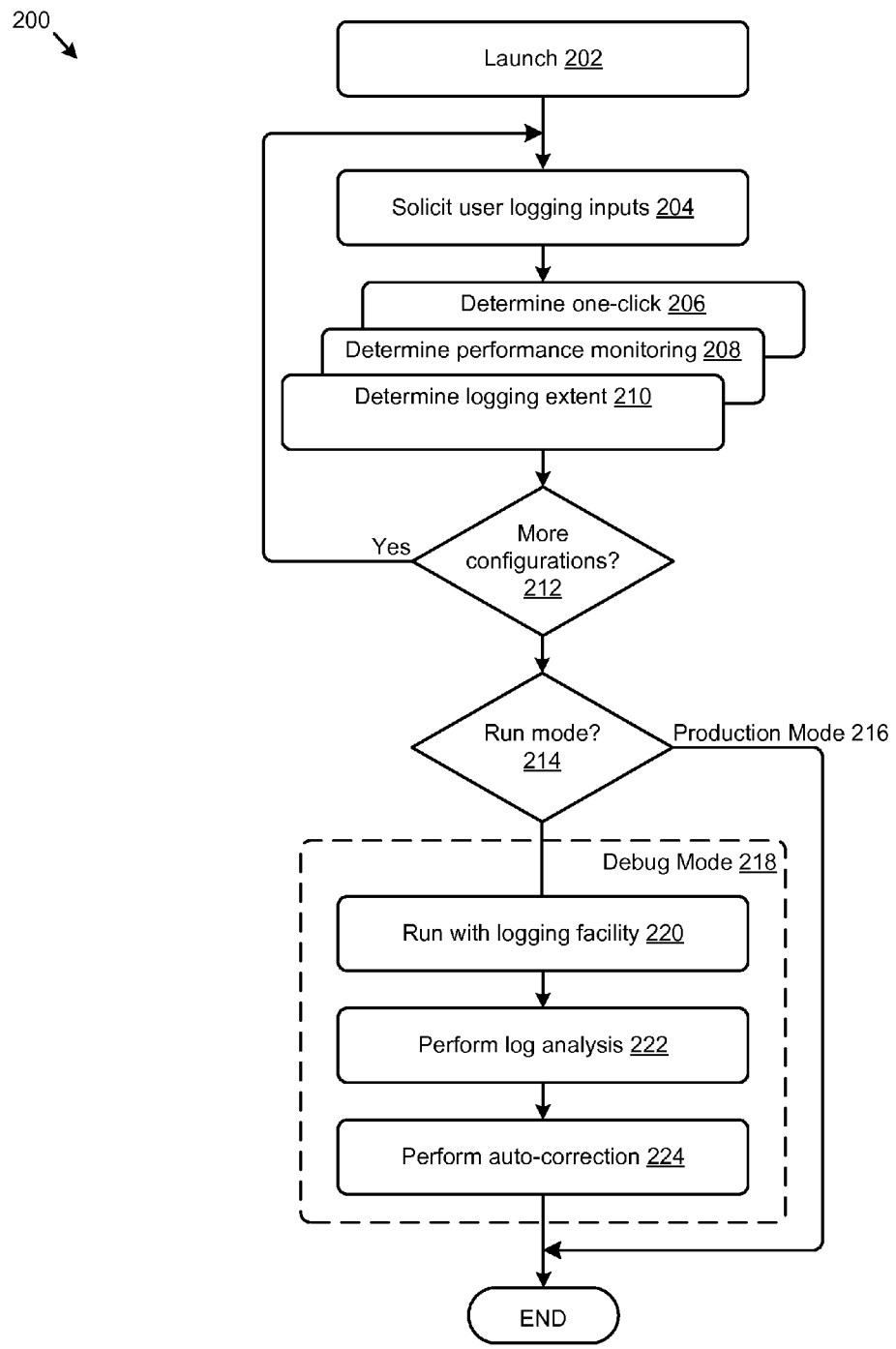
FIG. 2 exemplifies a session for configuring a user-directed debug mode, according to one embodiment.

FIG. 2 exemplifies a session 200 for configuring a user-directed debug mode. As an option, one or more instances of session 200 or any aspect thereof may be implemented in the context of the architecture and functionality of the embodiments described herein. Also, the session 200 or any aspect thereof may be implemented in any desired environment.

As shown in FIG. 2, the session (e.g., a session where a user interacts with the user-controllable diagnostics configuration module 114) begins when a user launches a support assistant module of the user-controllable diagnostics configuration module 114 (see step 202). The user traverses a loop wherein user inputs are solicited (see step 204) and user inputs or controls are received. The user inputs include, for example, control signals that indicate whether or not to turn on logging for the tool. In the shown embodiment, the user inputs include solicitation so as to determine the logging extent (see step 210) and/or the extent of performance monitoring (see step 208) and/or if a one-click logging configuration is to be established (see step 206). The loop can continue so long as there are more configuration items (see decision 212) that the user wishes to enter.

Various types and combinations of diagnostics may be enabled in a single session. For example, logging might be turned on to generate data logs pertaining to the execution and operations of an application. In the same session performance monitoring might be turned on.

According to some embodiments, logging and other diagnostics are activated by turning on a "debug" mode. Debug mode 218 differs from production mode 216 at least in that certain types of data are tracked and potentially saved when operating in debug mode, which data would otherwise not be tracked and/or saved (e.g., as in production mode).

To avoid adding unnecessary overhead to the system, the debug mode can be implemented on a user-by-user basis. When logging is enabled for one user on the system, other users do not necessarily need to also be running in debug mode. Instead, those other users can be running in production mode.

The user interface presents parameters that can be set so as to configure operation in the debug mode. These parameters can be set, for example, to control the type and/or volume of log data to be captured and/or stored in the system. This aspect of the present embodiment contributes further to a way to minimize the overhead of logging events in the system. For example, instead of requiring exhaustive log data to be captured and stored, the parameters can be set such that only a subset of the available logging data is captured and stored. In accordance with the herein-disclosed techniques the subset can be user-initiated, and can be localized based on the user's credential and/or the user's role or roles (e.g., manager, clerk, VP, etc.).

If the determination of a run mode (see decision 214) was that logging is not desired, then at 210 the application is executed in normal production mode. Otherwise the debug mode 218 is entered, which in turn invokes or spawns processes or facilities for the debugging mode. Strictly as an example, the debug mode can include the ability to run with the logging facility in active state (see step 220), the ability to perform analysis over the captured log data (see step 222), and the ability to perform auto-correction (see step 224).

Running with the logging facility in active state refers to the condition that at least some measurements are taken at runtime. Not all measurements are necessarily logged. In some cases measurements are taken using a non-invasive instrument; in other cases, the instrument may introduce some measurement impact (e.g., a small amount of additional communication latency between modules). Various instrumentation types, measurement techniques, and measurement components are shown and discussed as pertaining to FIG. 3A.

Figure 3A:
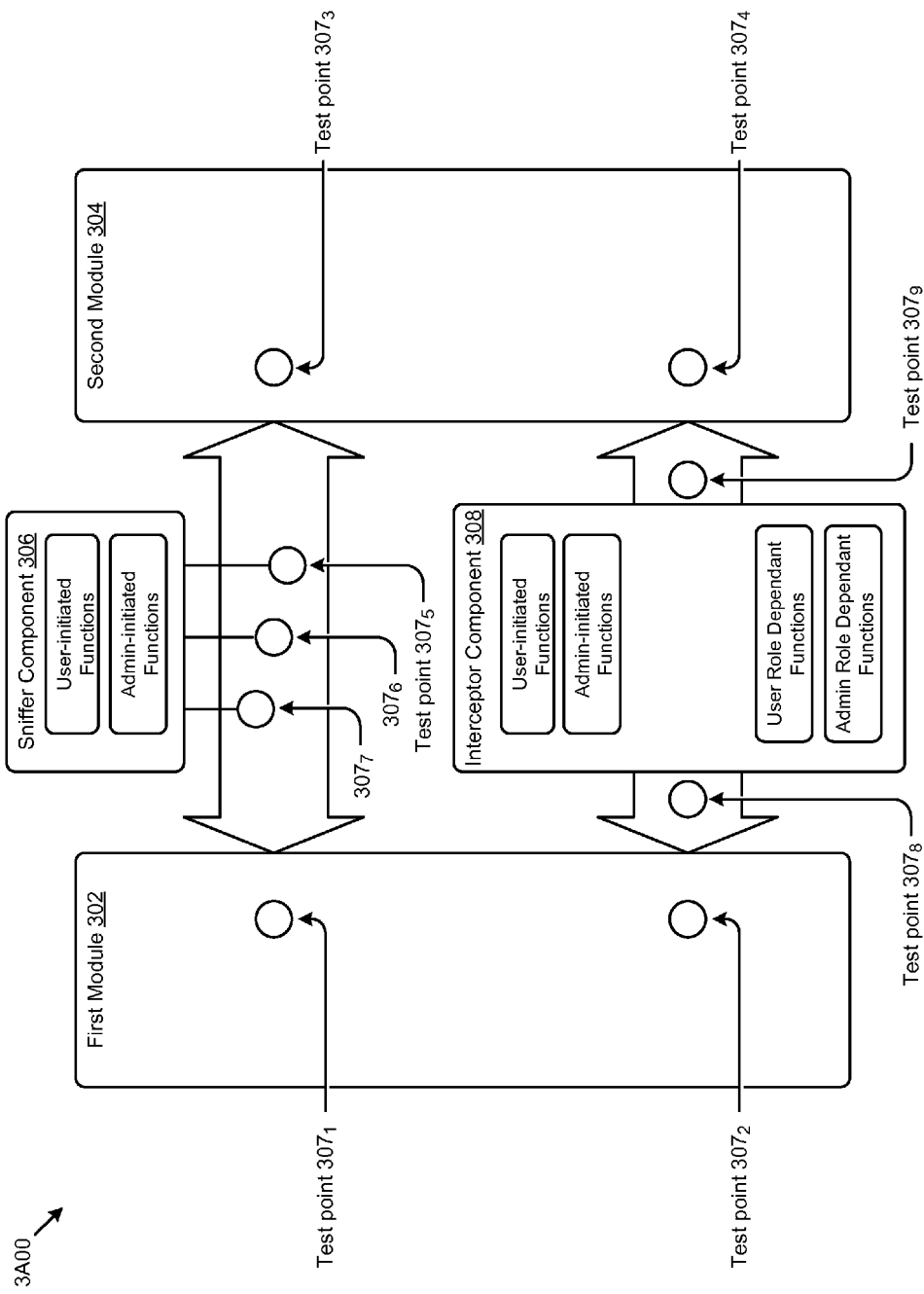
FIG. 3A depicts instrumentation types as used in systems that support user-directed diagnostics and auto-correction, according to some embodiments.

FIG. 3A depicts instrumentation types 3A00 as used in systems that support user-directed diagnostics and auto-correction. As an option, one or more instances of instrumentation types 3A00 or any aspect thereof may be implemented in the context of the architecture and functionality of the embodiments described herein. Also, the instrumentation types 3A00 or any aspect thereof may be implemented in any desired environment.

As shown in FIG. 3A, modules of a system (e.g., a first module 302 and a second module 304) comprise test points (e.g., testpoint $307_1$, testpoint $307_2$, testpoint $307_3$, testpoint $307_4$). Communication paths between modules can also offer test points within or at terminals of various communication infrastructure (e.g., testpoint $307_5$, testpoint $307_6$, testpoint $307_7$, testpoint $307_8$, testpoint $307_9$, etc.). As shown, the instrumentation types comprise a sniffer component 306 and an interceptor component 308. The sniffer type merely touches or otherwise passively monitors the behavior at the test point, which test point can be a hardware test point (e.g., a hardware terminal) or a software test point (e.g., at a software I/O boundary). The interceptor type monitors the behavior at the test point by intercepting traffic, making measurements against the traffic, and then forwarding the intercepted traffic. The interceptor type might forward the intercepted traffic in an unmodified manner, or the interceptor type might forward the intercepted traffic after making some modification to the intercepted traffic.

Figure 3B:
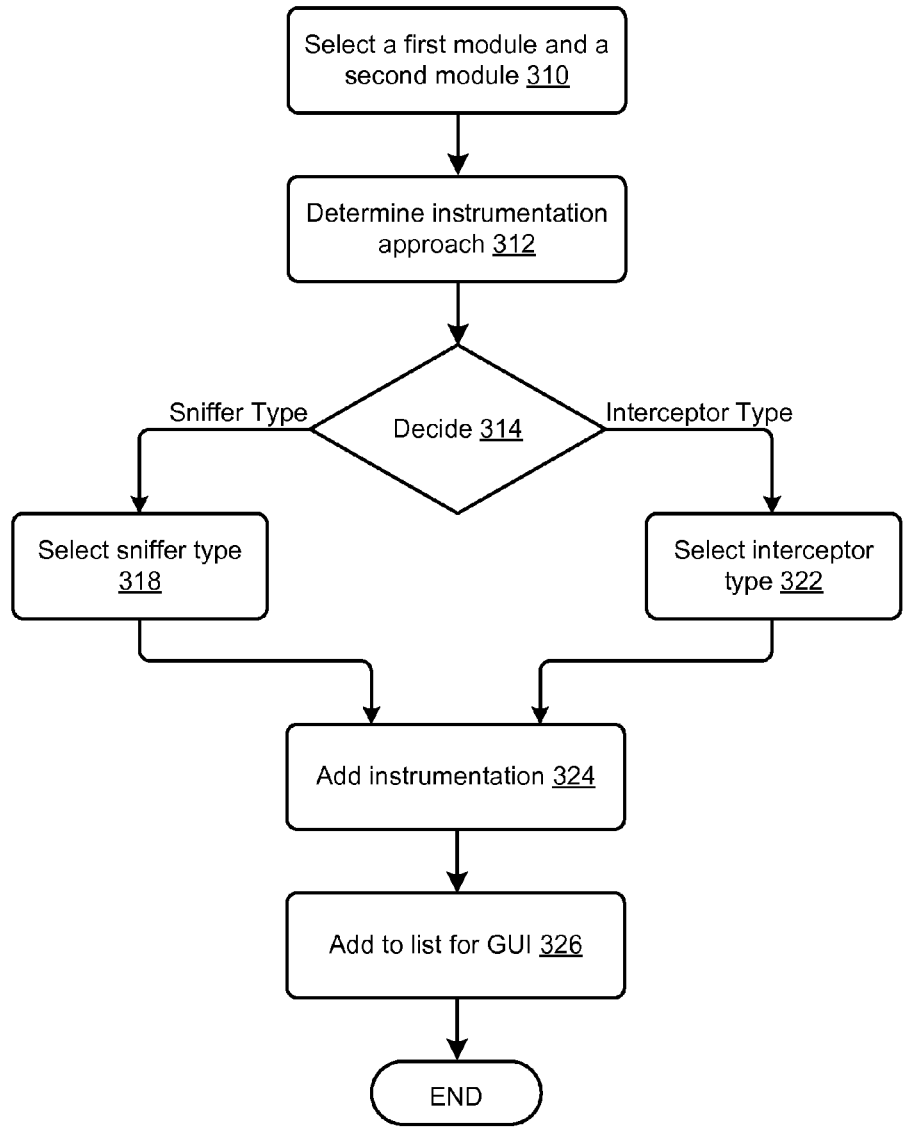
FIG. 3B is an operation flow to select instrumentation types as used for logging and diagnostics upon entering a user-directed debug mode, according to some embodiments.

Selecting the type of instrumentation to be used as a particular test point is shown and described as pertains to FIG. 3B.

FIG. 3B is an operation flow 3B00 to select instrumentation types as used for logging and diagnostics upon entering a user-directed debug mode. As an option, one or more instances of operation flow 3B00 or any aspect thereof may be implemented in the context of the architecture and functionality of the embodiments described herein. Also, the operation flow 3B00 or any aspect thereof may be implemented in any desired environment.

As shown in FIG. 3B, the operation flow selects a first module and a second module (see step 310) and, based on the characteristics of the selected modules, an instrumentation approach can be determined. In the embodiments shown, the determination as to what type of instrumentation is applicable for the module 312 and/or the communication link between modules can be bifurcated (see decision 314). In this example, the decision selects between deployment of a sniffer type (see step 318) or an interceptor type (see step 322). Other instrumentation types are possible, and the determination as to what type of instrumentation is applicable for the module and/or the communication link between modules can involve multiple levels of decision criteria. The criteria might be used in conjunction with a set of heuristics.

The selected type of instrumentation is added at or near the test point (see step 324) and the selected instrument as well as the location of the test point (e.g., within a module, or within or at a terminal point of the communication infrastructure) is added to a list (see step 326) which list is used in generation of a graphical user interface (e.g., see FIG. 5A through FIG. 5G).

Logging is one of the capabilities of the selected instrumentation, and such logging can be turned on or off or triggered to be on or off under user-directed control. The nature of the data to be logged is not limited by this disclosure, and the examples below are merely examples of modules or test points to be monitored.

The following includes some example types of data that can be logged (e.g., to a shared memory segment):
  Calls to a database engine.
  Calls to local in memory data storage.
  Calls around software logic blocks.

The data saved and/or maintained for each of above could include, without limitation, any of the following:
  A profile of the number of invocations to database or logic blocks.
  A timing indication pertaining to the timing and occurrences of invocations to database queries or logic blocks.
  Maximum, minimum, average, first time calls.
  A graph of the parent and children surrounding an invocation of various database and logic blocks.

Figure 4A:
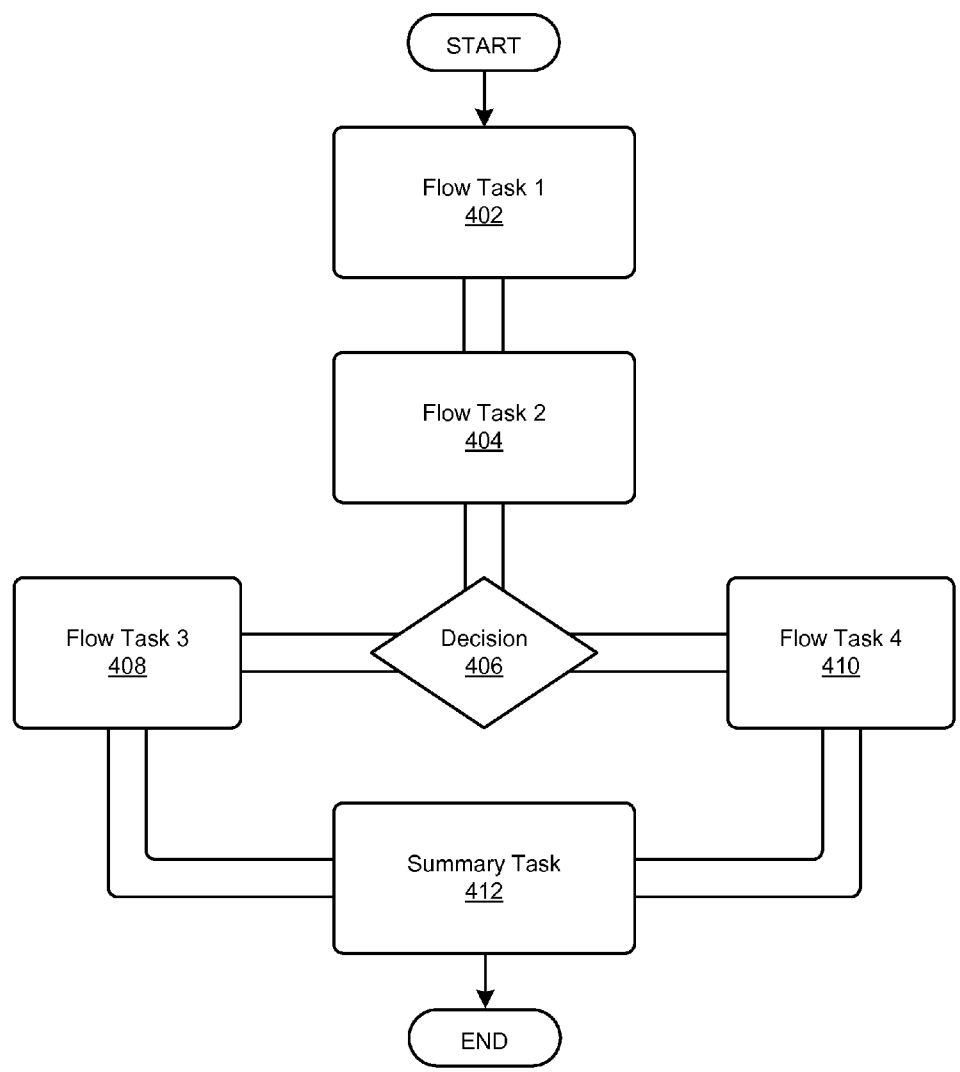
FIG. 4A depicts an enterprise application task flow suitable for injection of instrumentation to support user-directed diagnostics and auto-correction, according to some embodiments.

FIG. 4A depicts an enterprise application task flow 4A00 suitable for injection of instrumentation to support user-directed diagnostics and auto-correction. As an option, one or more instances of enterprise application task flow 4A00 or any aspect thereof may be implemented in the context of the architecture and functionality of the embodiments described herein. Also, the enterprise application task flow 4A00 or any aspect thereof may be implemented in any desired environment.

As shown in FIG. 4A, the enterprise application task flow depicts movement between tasks. In some cases, a user might not have a detailed understanding of the underlying processing and/or communication architecture. Nevertheless, a user might know where (e.g., where in a flow) the observed problems or variances occur. In such cases, it is reasonable to present the user with options to add instrumentation at or between tasks.

Even though a user might not have a detailed understanding of the underlying processing and/or communication architecture, merely knowing the task or tasks where the problem can be observed can be enough to add instrumentation. For example, a task flow might comprise entry into task 1 (see step 402), then on to task 2 (see step 404), into a decision point (see decision 406), and on to either task 3 (see step 408) or to task 4 (see step 410) before initiating a summary task (see step 412). In such a flow, test points might be present within tasks (e.g., at test points accessible from the underlying computing architecture), and/or at decision points, and/or between tasks.

When a user identifies the task or tasks where the problem can be observed, an automated process can inject instrumentation at test points accessible from the underlying architecture.

Figure 4B:
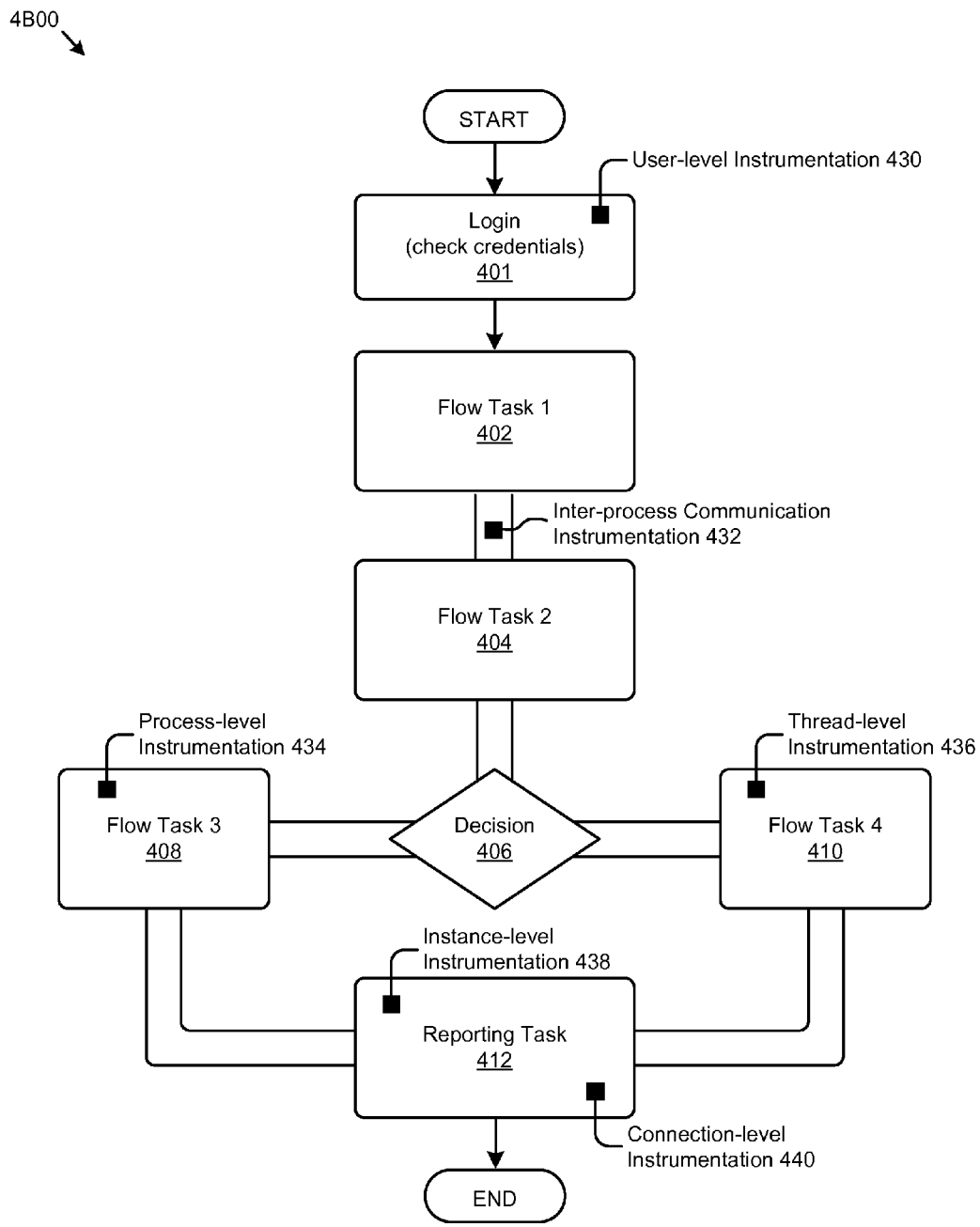
FIG. 4B depicts an instrumentation injection technique as used to support user-directed diagnostics and auto-correction, according to some embodiments.

FIG. 4B depicts an instrumentation injection technique 4B00 as used to support user-directed diagnostics and auto-correction. As an option, one or more instances of instrumentation injection technique 4B00 or any aspect thereof may be implemented in the context of the architecture and functionality of the embodiments described herein. Also, the instrumentation injection technique 4B00 or any aspect thereof may be implemented in any desired environment.

As shown in FIG. 4B, the instrumentation injection technique comprises injection of user-level instrumentation (see instrumentation 430) and/or inter-process communication instrumentation (see instrumentation 432) and/or process-level instrumentation (see instrumentation 434) and/or thread-level instrumentation (see instrumentation 436) and/or instance-level instrumentation (see instrumentation 438) and/or connection-level instrumentation (see instrumentation 440).

A user can merely identify an area (e.g., an area comprising one or more tasks), and instrumentation can be automatically injected. In some cases, the injected instrumentation includes monitoring of various conditions, and the occurrence of a particular specified condition and/or reporting state of a particular diagnostic can automatically trigger corrective action.

Figure 4C:
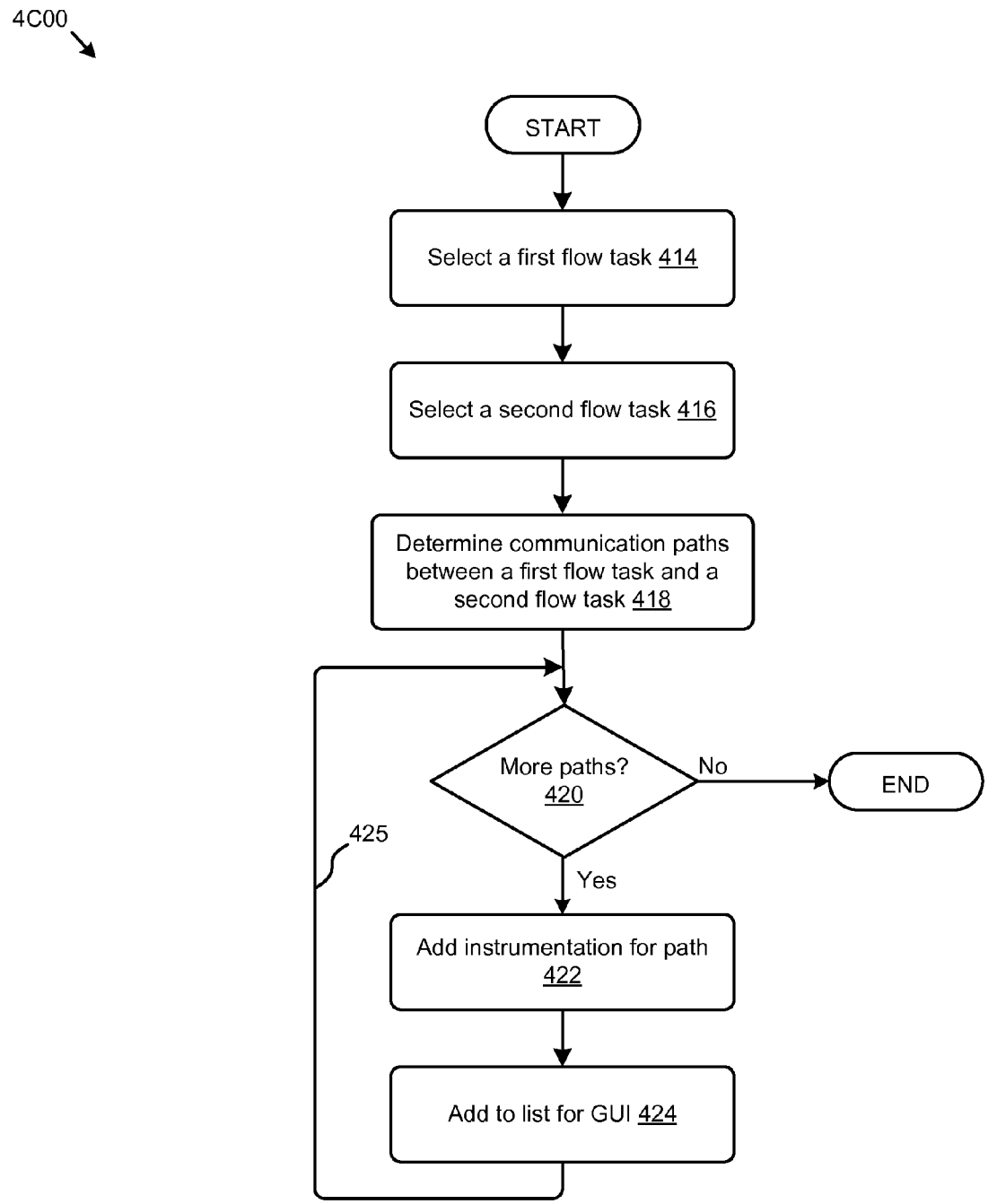
FIG. 4C depicts an instrument injection operation flow as used to configure a graphical user interface to facilitate user-directed diagnostics and auto-correction, according to some embodiments.

FIG. 4C depicts an instrument injection operation flow 4C00 as used to configure a graphical user interface to facilitate user-directed diagnostics and auto-correction. As an option, one or more instances of instrument injection operation flow 4C00 or any aspect thereof may be implemented in the context of the architecture and functionality of the embodiments described herein. Also, the instrument injection operation flow 4C00 or any aspect thereof may be implemented in any desired environment.

As shown in FIG. 4C, the instrument injection operation flow further comprises formatting aspects of a graphical user interface (e.g., in HTML) for determining the area of interest (see operation 414 and operation 416). Such an area of interest might be determined based on a user specification of a particular area of interest, or it might be determined based on a particular condition and/or a particular reporting state of a particular diagnostic.

There may be various types of communication between tasks, and operations within the instrument injection operation flow 4C00 serve to determine a set of communication paths between one task and another (see step 418). Instrumentation can be injected at many test point and at many paths. An iterator (see loop 425) serves to add instrumentation for a test point on the identified path (see step 422) and loop back to a next iteration so long as there are more paths (see decision 420). When the operations within the loop add instrumentation for a test point on the identified path, the nature of the instrumentation is added to a list used in generating a user interface (see step 424).

The presentation of which instruments to configure for logging collection is shown and described in the following figures.

Figure 5A:
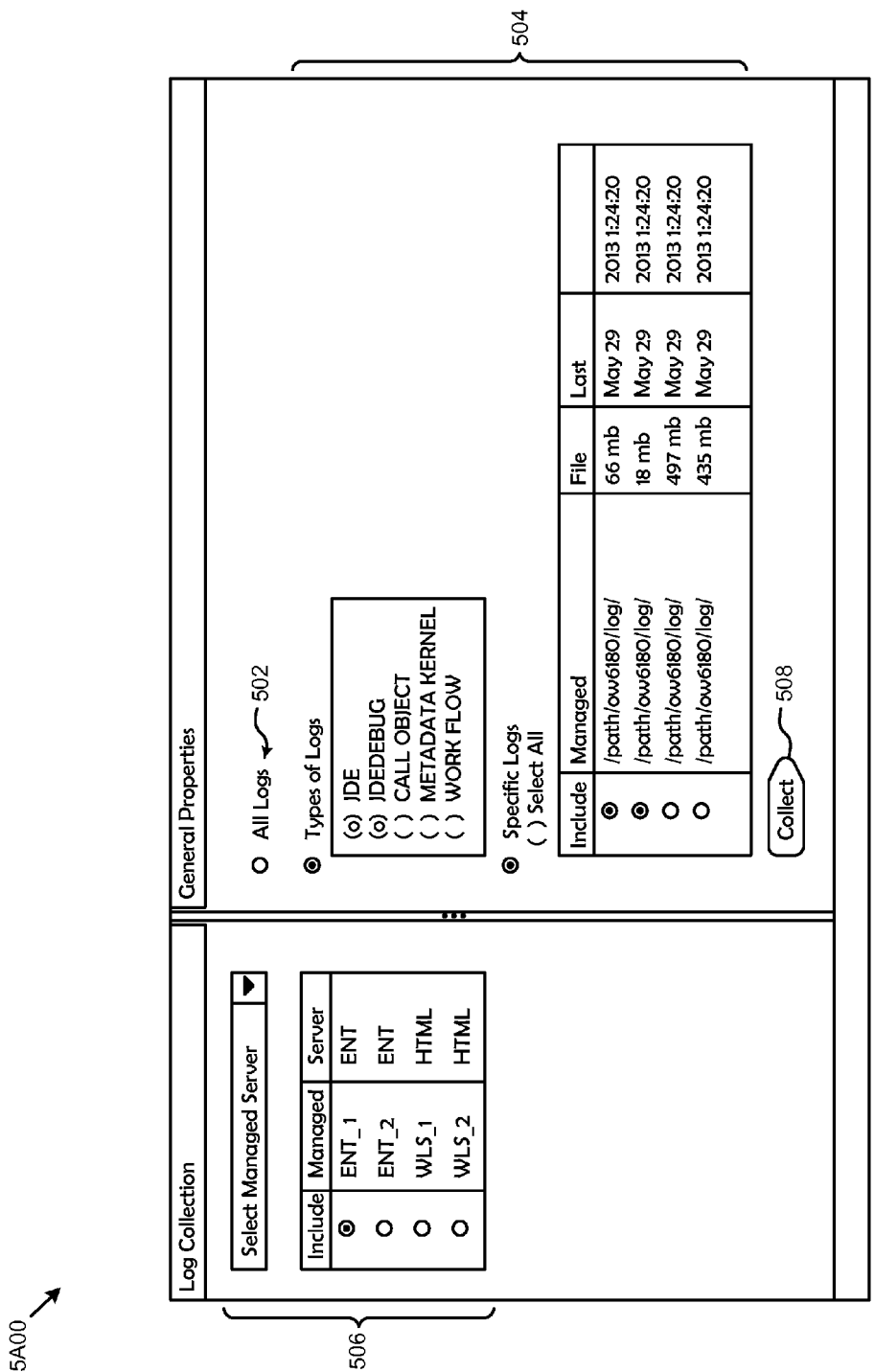
FIG. 5A shows a log collection screen for configuring user-directed diagnostics and auto-correction, according to some embodiments.

FIG. 5A shows a log collection screen 5A00 for configuring user-directed diagnostics and auto-correction. As an option, one or more instances of log collection screen 5A00 or any aspect thereof may be implemented in the context of the architecture and functionality of the embodiments described herein. Also, the log collection screen 5A00 or any aspect thereof may be implemented in any desired environment.

The shown user interface can be operated by an enterprise application user. In some embodiments, security levels may be defined to allow or deny access to any particular aspect of a logging configuration. In some embodiment, there may exist multiple roles that influence allow/deny access determinations. Strictly as some examples, a user can be identified as a 'Basic User' or as an 'Advance User'. Continuing this example, a 'Basic User' might only have an option to capture 'All' (see element 502), while an 'Advanced User' might have additional options available (see log collection elements 504) that facilitate user-directed configuration of logging. Some embodiments support user-directed selection of log collection based on a named server (see general property elements 506).

The user-level screens (e.g., the log collection screen 5A00) comprise labels, which labels are used to indicate a meaning corresponding to a logging capability. For example, the log collection elements 504 comprise labels in the form of "JDE" (e.g., referring to a type of log), "JDEDEBUG" (e.g., referring to a type of log), etc. Other labels may refer to user-defined and/or user-controlled file names. For example, the path and filename "/path/ow6180/log/" is such a label. Exemplary embodiments include labels that are associated with local (e.g., user-initiated) activities, and some embodiments include labels that are associated with global (e.g., administrator-initiated) activities. For example, when the label next to the option to capture 'All Logs' (see element 502) is shown to a regular user, it might refer to a limited set of local captures pertaining to the computing footprint of only that user or pertaining to only that user's role. Conversely, when the label next to the option to capture 'All Logs' (see element 502) is shown to an administrator or super-user, that label might refer to a global set of log captures pertaining to the entire computing footprint and/or referring to the full extent of that super-user's role. Using the user-level or admin-level role(s) and/or privileges, the logging can be initiated for global collection (e.g., corresponding to an admin-initiated logging specification), or logging can be initiated for local collection (e.g., corresponding to a user-initiated logging specification).

In some embodiments, upon initiating the logging (see collect toggle button 508), the instrumentation accumulates data (e.g., in a shared memory segment) as the application runs. The output can be summarized. For example, it is possible to present logged items in a hierarchy such that individual business function memory diagnostics (BSFN), and/or SQL calls, and/or API calls can be collapsed such that only a summary indication is presented in a default summary presentation. The hierarchy can be expanded to show individual contributions to the summary.

In some approaches, instrumentation accumulates data in a shared memory segment. In other approaches, a disk file is maintained. In still other approaches, a summary report (e.g., with expandable/collapsible regions) can be continuously saved in HTML hyperlinked format so long as the logging facility is configured to collect (see collect toggle button 508).

In addition to toggling on or off logging (e.g., as described above) screen captures and/or video captures can be configured.

Figure 5B:
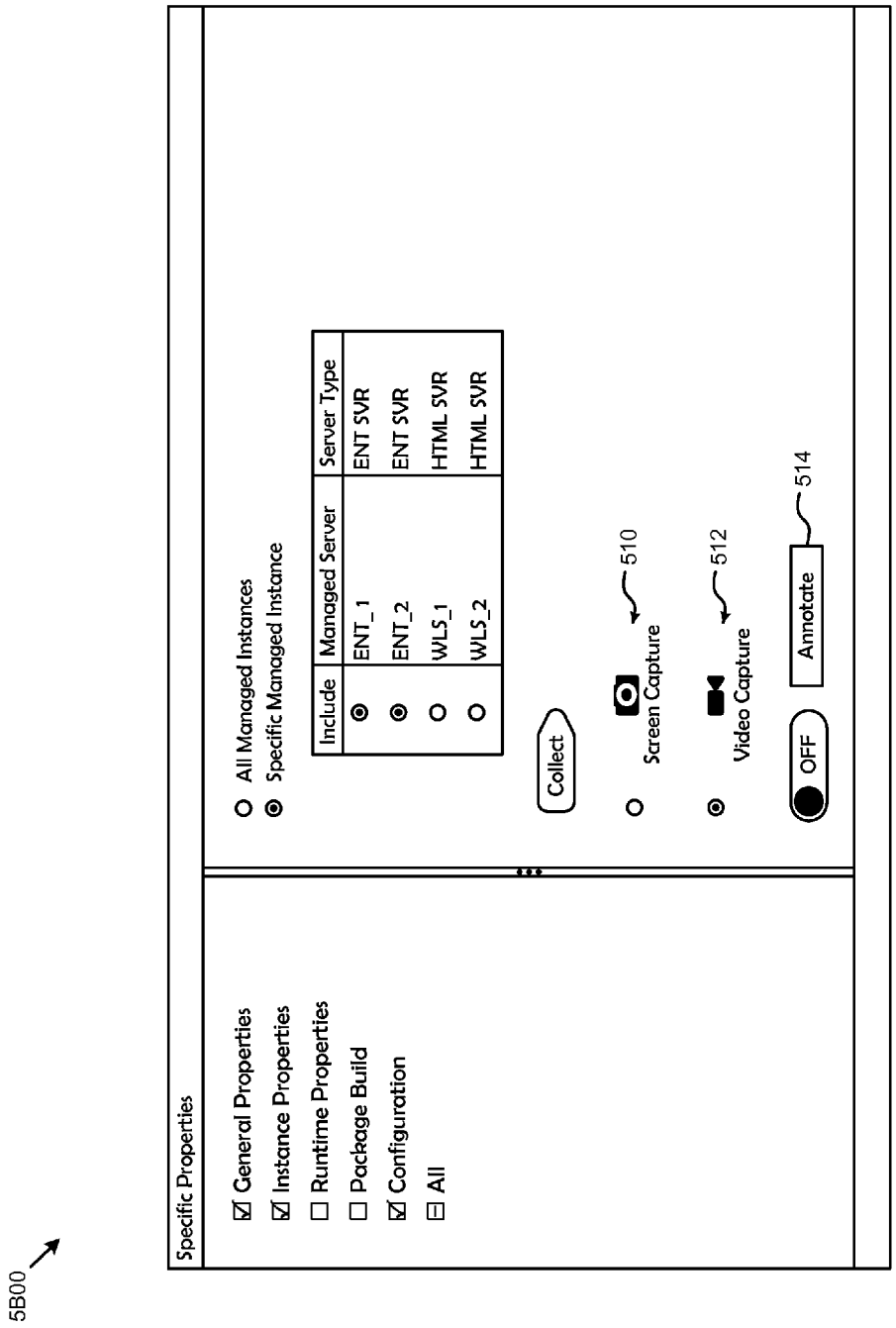
FIG. 5B shows a properties edit screen for configuring user-directed screen capture and video capture, according to some embodiments.

FIG. 5B shows a properties edit screen 5B00 for configuring user-directed screen capture and video capture. As an option, one or more instances of properties edit screen 5B00 or any aspect thereof may be implemented in the context of the architecture and functionality of the embodiments described herein. Also, the properties edit screen 5B00 or any aspect thereof may be implemented in any desired environment.

As shown in FIG. 5B, the properties edit screen comprises an area for user-directed selection of a screen capture (see screen capture widget 510) and/or a video capture (see video capture widget 512). Additionally, such a properties edit screen provides an on/off facility and a launching point (see annotate button 514) from which launch point the user can enter a screen capture or video capture editing tool.

Figure 5C:
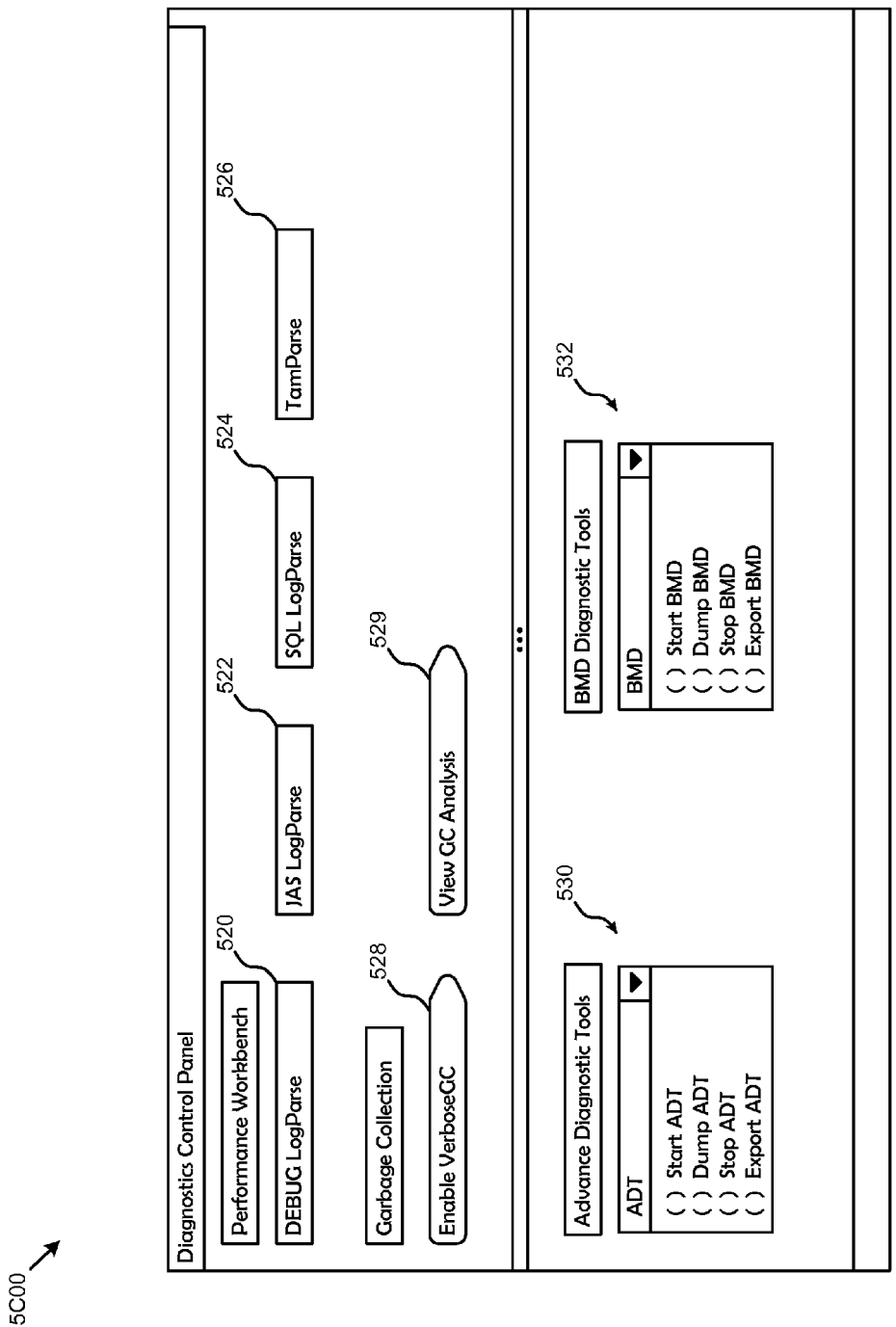
FIG. 5C shows a diagnostics control panel user interface for configuring user-directed diagnostics and auto-correction, according to some embodiments.

FIG. 5C shows a diagnostics control panel user interface 5C00 for configuring user-directed diagnostics and auto-correction. As an option, one or more instances of diagnostics control panel user interface 5C00 or any aspect thereof may be implemented in the context of the architecture and functionality of the embodiments described herein. Also, the diagnostics control panel user interface 5C00 or any aspect thereof may be implemented in any desired environment.

As shown in FIG. 5C, the diagnostics control panel user interface comprises an entry point to access a performance monitor user interface (see FIG. 5D) as well as controls to enable/disable various log-oriented aspects of performance diagnostics. The aforementioned aspects of performance diagnostics can include without limitation a debug log parse option 520, a JAS log parse option 522, a SQL log parse option 524, and a metadata parse option 526. The metadata option is used to render metadata in a way that assists in the interpretation of the performance diagnostics. Additionally, garbage collection options are presented to a user (e.g., a button to enable verbose option 528, and a button to view garbage collection analysis 529).

In some cases, (e.g., for an advanced user) the diagnostics control panel user interface includes access to advanced diagnostic tools (ADT). As shown, selection of several aspects (e.g., Start, Dump, Stop and Export) are user-directed via use of an ADT pull-down menu 530. In some cases, additional diagnostic support is provided via a business function pull-down menu 532. The business function memory diagnostics or "BMD" utility is used to analyze memory usage of the business logic.

Figure 5D:
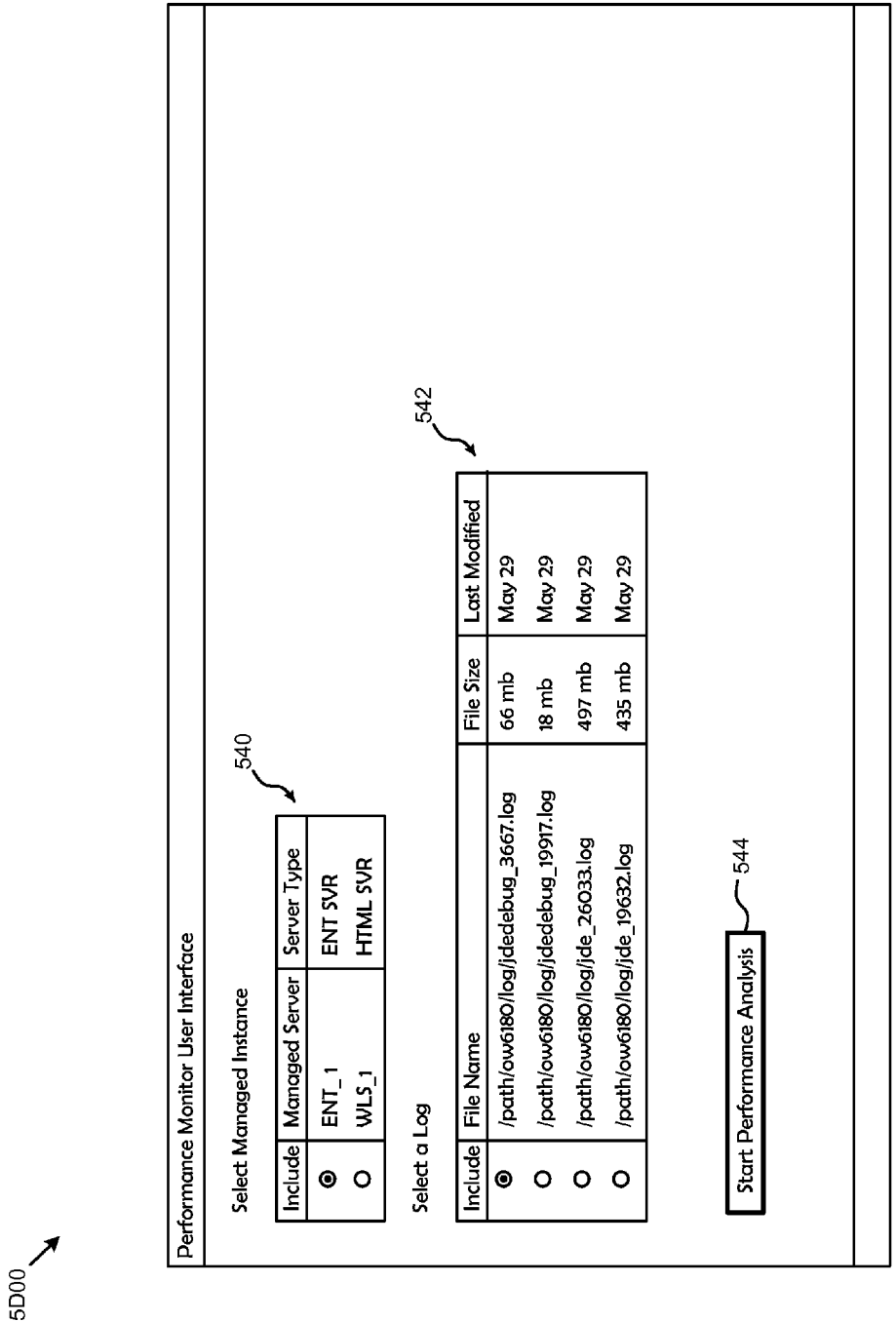
FIG. 5D exemplifies a performance monitor user interface for configuring user-directed performance monitoring and analysis, according to some embodiments.

FIG. 5D exemplifies a performance monitor user interface 5D00 for configuring user-directed performance monitoring and analysis. As an option, one or more instances of performance monitor user interface 5D00 or any aspect thereof may be implemented in the context of the architecture and functionality of the embodiments described herein. Also, the performance monitor user interface 5D00 or any aspect thereof may be implemented in any desired environment.

As shown in FIG. 5D, the performance monitor user interface comprises an area to facilitate user-directed selection of which database instances are to be monitored for performance characteristics. In some cases, an enterprise application might use several database instances, and each database instance can be controlled independently via an instance selection area 540. A log file can be selected as a target repository for ongoing logging. As shown, a log file selection area 542 can be presented within a performance monitor user interface, and a user can select a log file (e.g., by path or file size, or last modification date, etc.). The configured performance monitoring (e.g., configured by the user using the instance selection area 540 and/or the log file selection area 542 can be started using the shown start performance analysis button 544.

Figure 5E:
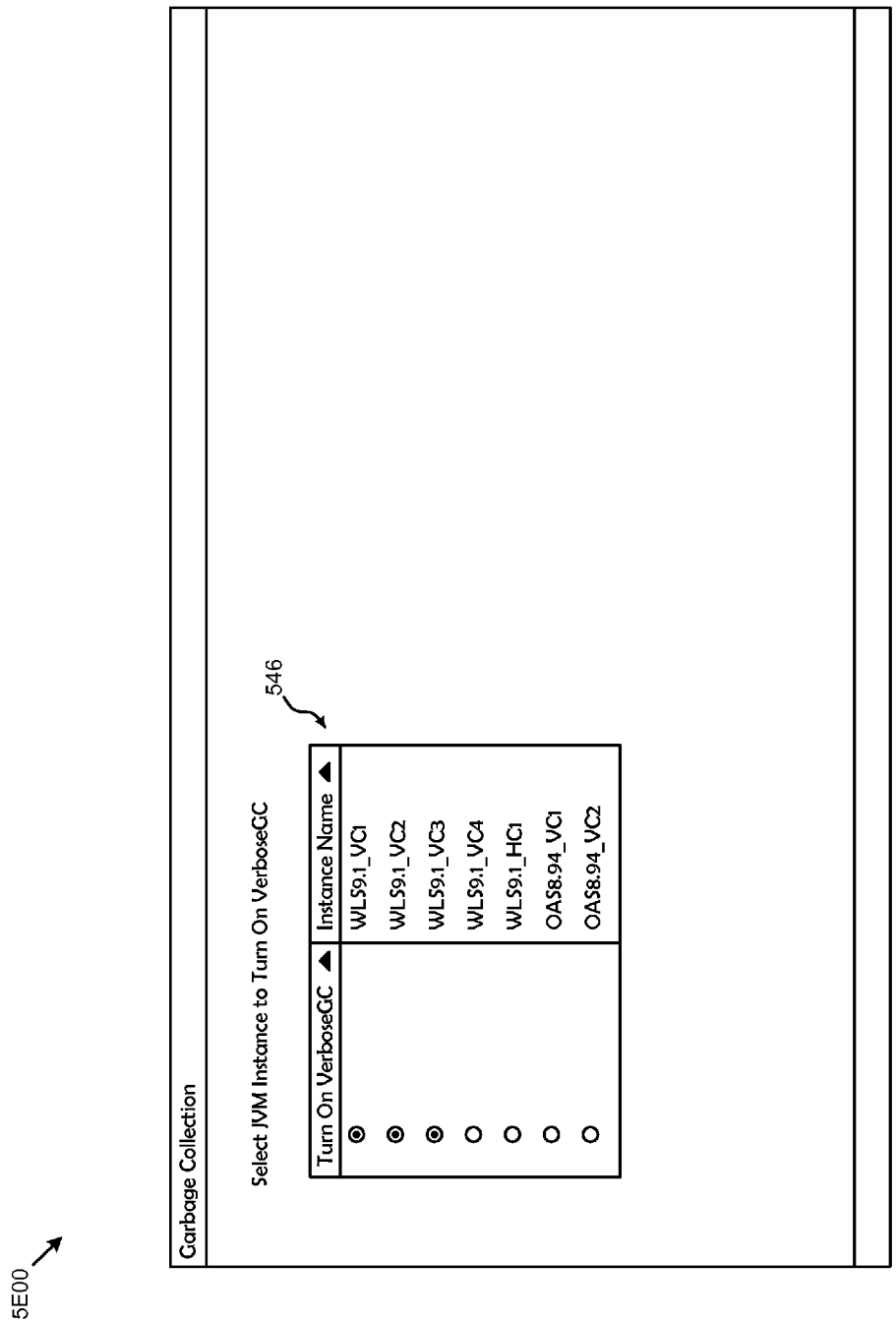
FIG. 5E depicts a garbage collection configuration user interface 5E00 for configuring user-directed log file analysis, according to some embodiments.

FIG. 5E depicts a garbage collection configuration user interface 5E00 for configuring user-directed log file analysis. As an option, one or more instances of garbage collection configuration user interface 5E00 or any aspect thereof may be implemented in the context of the architecture and functionality of the embodiments described herein. Also, the garbage collection configuration user interface 5E00 or any aspect thereof may be implemented in any desired environment.

As shown in FIG. 5E, the garbage collection configuration user interface comprises an area to select verbose garbage collection logging 546. In a given enterprise application environment, there may be many JAS server components, and any one or more can be individually selected for verbose logging of garbage collection. Such a feature and area to select verbose garbage collection logging might be presented only to advanced users.

Figure 5F:
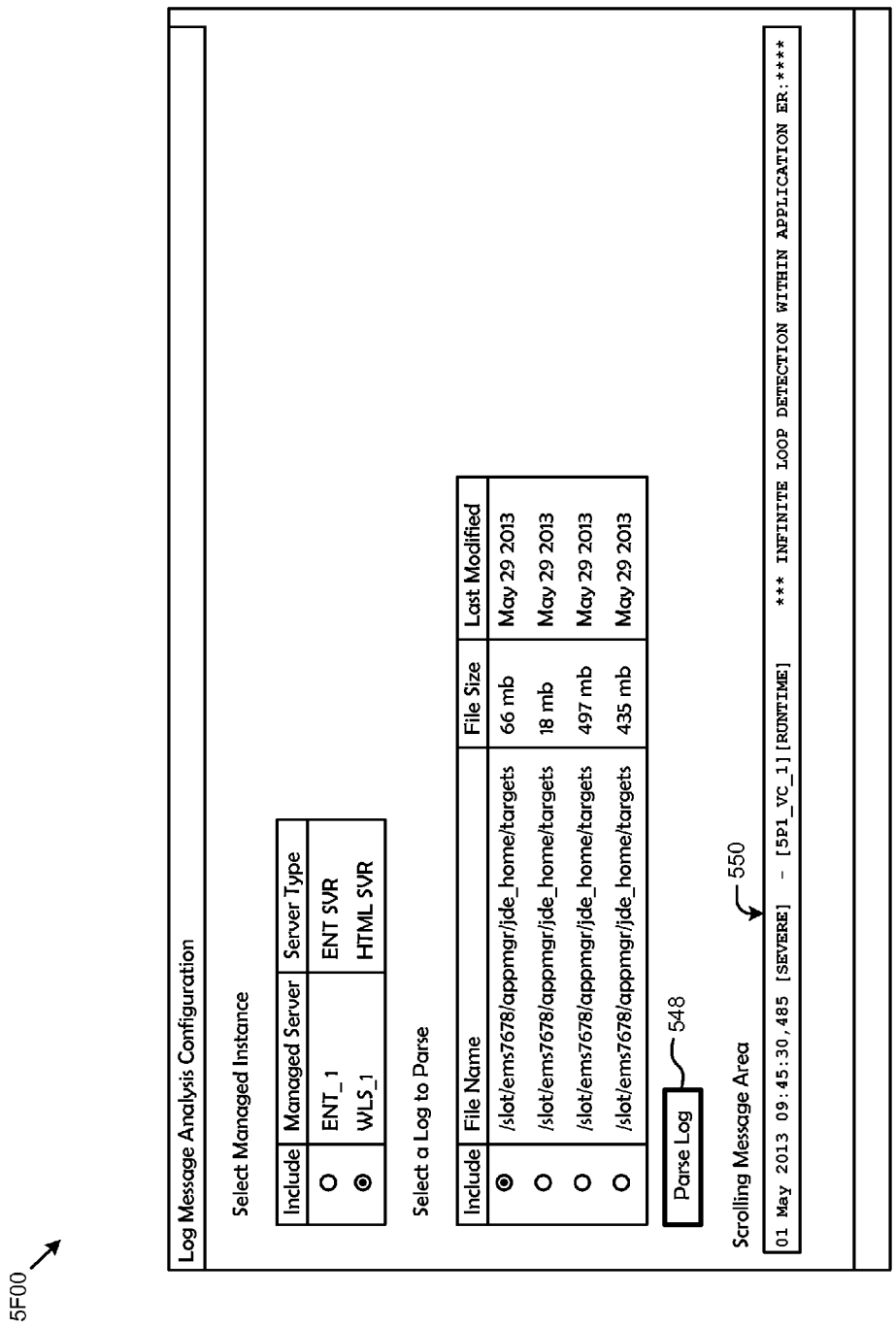
FIG. 5F depicts a log message analysis configuration user interface for configuring user-directed log file analysis, according to some embodiments.

FIG. 5F depicts a log message analysis configuration user interface 5F00 for configuring user-directed log file analysis. As an option, one or more instances of log message analysis configuration user interface 5F00 or any aspect thereof may be implemented in the context of the architecture and functionality of the embodiments described herein. Also, the log message analysis configuration user interface 5F00 or any aspect thereof may be implemented in any desired environment.

The log message analysis configuration user interface might be auto-populated and might pop-up when a logging session completes (e.g., when an application session ends, or when a monitored task completes, etc.) and such a log message analysis configuration user interface might include an option to parse the log file(s). The shown log message analysis configuration user interface includes a summary of the log settings (see FIG. 5D) as well as a parse log button 548, and a scrolling message area 550. In the course of a log file parse session, messages are emitted from the parse logic and are added to the scrolling message area 550. Messages of particular significance for debugging are easily identifiable (e.g., using asterisks or color).

Figure 5G:
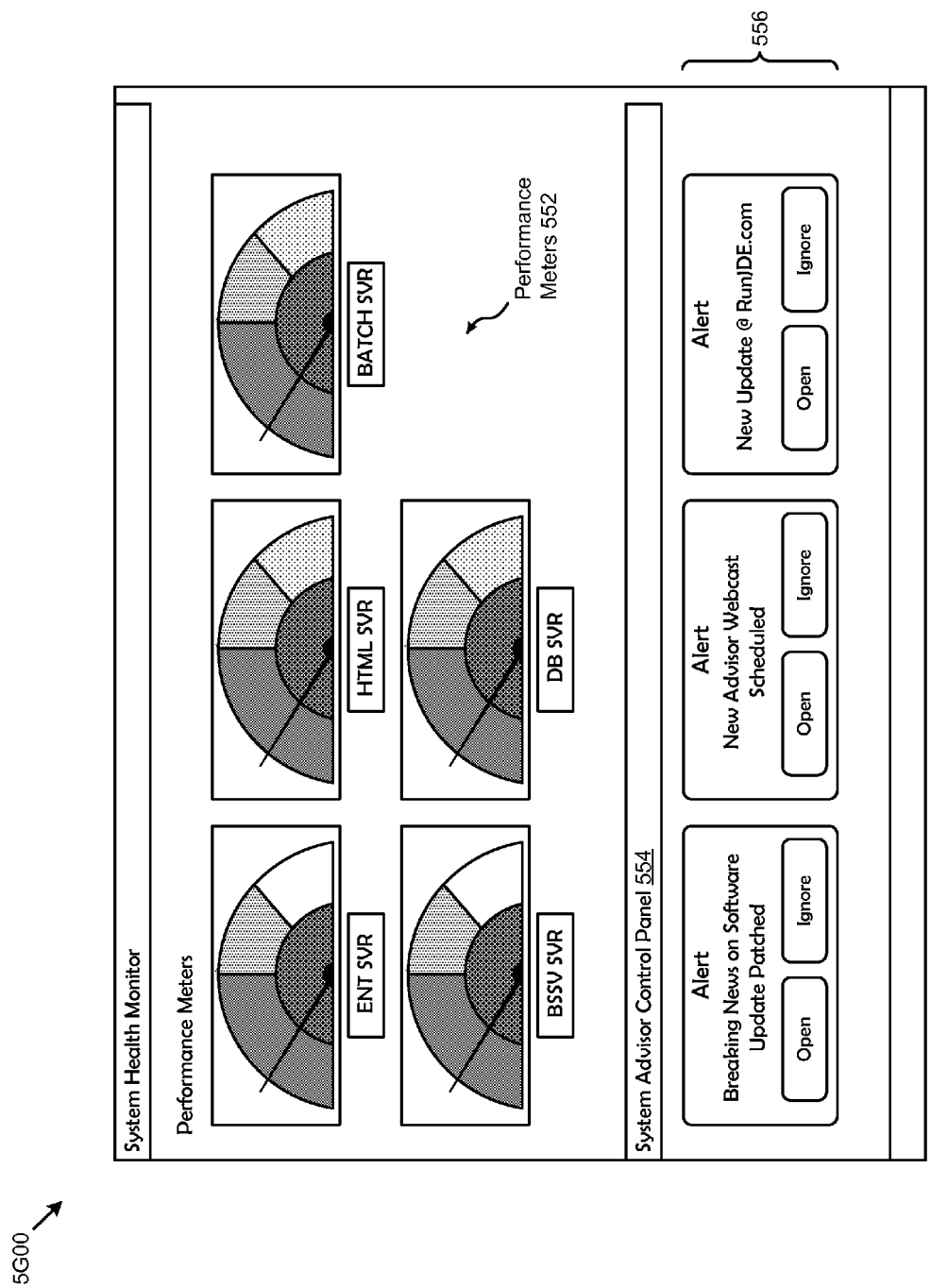
FIG. 5G exemplifies a system health monitor dashboard for configuring user-directed system alerts, according to some embodiments.

FIG. 5G exemplifies a system health monitor dashboard 5G00 for configuring user-directed system alerts. As an option, one or more instances of system health monitor dashboard 5G00 or any aspect thereof may be implemented in the context of the architecture and functionality of the embodiments described herein. Also, the system health monitor dashboard 5G00 or any aspect thereof may be implemented in any desired environment.

As shown in FIG. 5G, the system health monitor dashboard comprises dynamically-updated performance meters. A user might be able to identify a bottleneck or pinch point using such performance meters 552. Additionally, a system advisor control panel 554 offers alerts such as updates pertaining to software updates and/or advisor bulletins (e.g., via podcasts), and/or might facilitate initiation of an advisor session (e.g., via a webcast). Any sorts of other updates can be offered to the user, such as using an update alert 556.

One possible outcome from the collection and analysis of log data as heretofore described might be remediation in the form of auto-correction. Auto-correction can proceed in accordance with one or more flows, some of which flows are shown and discussed as pertaining to FIG. 6A and FIG. 6B.

Figure 6A:
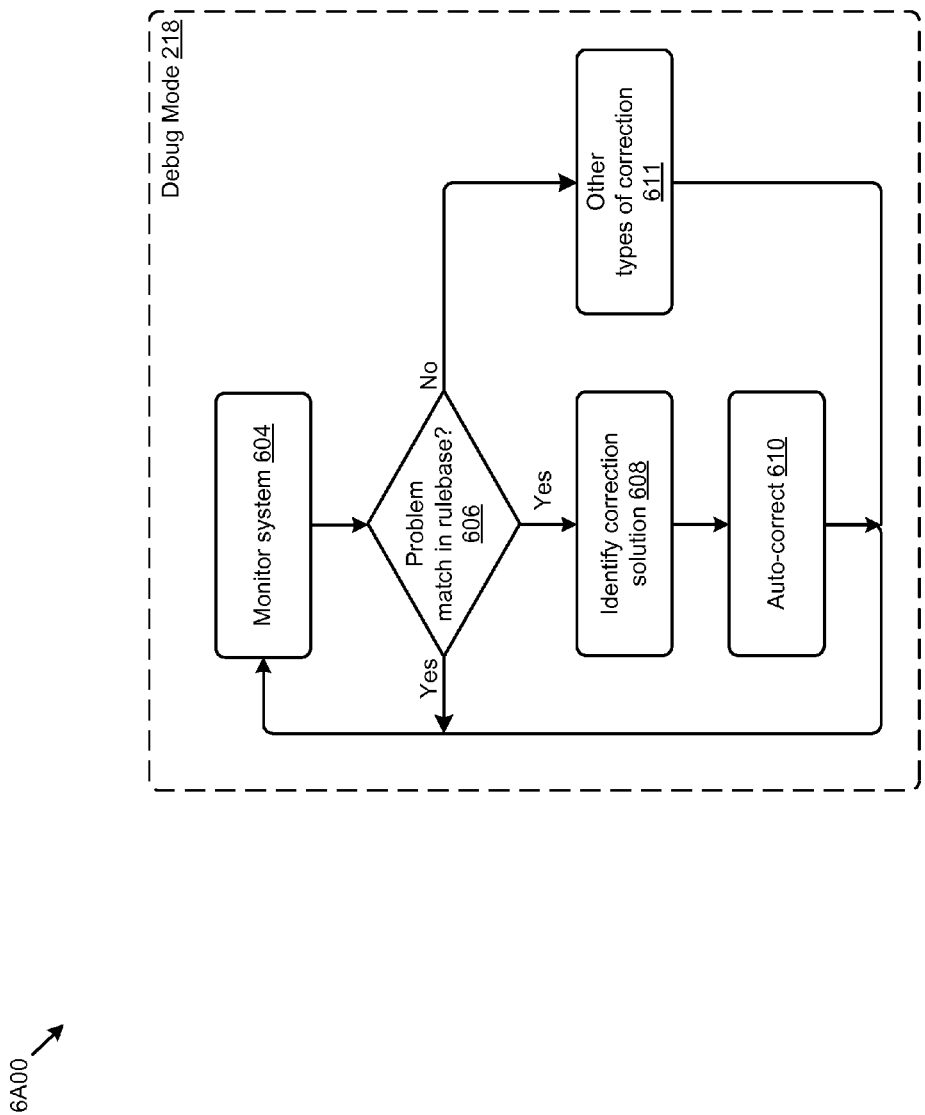
FIG. 6A exemplifies an auto-correction flow as used in systems supporting user-directed diagnostics and auto-correction, according to one embodiment.

FIG. 6A exemplifies an auto-correction flow 6A00 as used in systems supporting user-directed diagnostics and auto-correction. As an option, one or more instances of auto-correction flow 6A00 or any aspect thereof may be implemented in the context of the architecture and functionality of the embodiments described herein. Also, the auto-correction flow 6A00 or any aspect thereof may be implemented in any desired environment.

As shown in FIG. 6A, the auto-correction flow operates in the context of a debug mode 218. During operations in a debug mode, the auto-correction flow 6A00 might be entered, for example, when a particular monitoring scenario is defined. The monitoring (see step 604) may proceed asynchronously and continuously during any time period, and in the case when a problem is detected and identified, for example via a set of conditions, then the problem can be checked against a rulebase (see decision 606). If the problem is present in the rulebase, then the rulebase and/or other corpora are used to identify a correction solution (see step 608), and the identified solution is applied (see step 610). Several techniques for identifying a problem and any corresponding corrective actions are shown and discussed as pertains to FIG. 7A.

In some cases the problem is not found in the rulebase, and other types of correction might be indicated (see step 611). Strictly as an example, if a problem is repeatedly encountered but not found in the rulebase, then one or more forms of additional logging might be suggested. In some cases, manual correction is indicated.

In some situations, continuous diagnostic monitoring is performed on the system, and the monitoring performs checks on general state and/or health of the system.

The user interfaces of FIG. 5A through FIG. 5G illustrate example interfaces that can be used to monitor and/or troubleshoot the health and state of the system. Such interfaces provides a unified console that can be used to host multiple diagnostic tools. A unified console provides greater visibility into the state of the system, and can serve to provide a one-stop location for troubleshooting.

In addition to the metrics shown as described as pertaining to FIG. 5A through FIG. 5G, the following Table 1 gives example metrics that can be used in various operations that are deployed to automatically check for issues.

TABLE 1

| Example metrics |
| --- |
| JAS Server |
| System thread and compute usage<br>System memory usage<br>Java process behavior<br>SQL Query by User and Application |
| on logic server<br>operation runtime<br>SQL query by user and application<br>Transaction Server |
| Generic object events and their statuses<br>Length of time that events have been at a specific status |

TABLE 1-continued

Example metrics

Web-Services/Mobile Server

Usage statistics
Database Metrics

Users and user count
Number of connections

A repository can be used to collect and store such data items. This allows the diagnostic tool to provide data persistency for historic views, and further allows for trend analysis (e.g., for health monitoring and to provide a system advisor).

As indicated above, the auto-corrective engine makes a determination as to whether a problem in the system has been identified (see decision 606). In some cases, the occurrence of identified problems are merely logged. In other cases, the problem is known to be a problem that needs corrective action, and the auto-correct facility can take such corrective actions on behalf of the user. Such auto-correction can be performed, for example, by using a rules processing engine to process the set of rules in a corrective actions rulebase. The rules may be structured as a set of IF-THEN statements, which tries to match the current state to a state for which the rulebase has identified as a problem state.

If a problem has been identified and the rulebase contains the appropriate corrective action, then at 608, identification is made of the corrective action, and the identified corrective action is made to the system.

Any suitable type of corrective action may be auto-performed. The following are some example auto-diagnosis and/or auto-correction actions to be taken as are depicted in various embodiments:

Detect of high memory usage.
Clear system cache.
Invoke log memory diagnostic.
Auto restart process/instance.
Detect high CPU process.
Detect deep call stack or high CPU usage by a thread or process or instance.
Kill the high CPU thread or process.
Auto restart instance if looping identified.
Detect a hung process.
Capture call stack of the hung thread or process.
Kill the hung or deadlocked threads or processes.
Auto restart instance if processes cannot be killed or main entity is hung.
Detect high memory process.
Clear service cache.
Initiate verbose garbage collection.
Log java heap dump.
Detect high CPU utilization from a thread or process.

Any of the foregoing can be included in a rulebase, and a rulebase can be consulted to determine one or more corrective actions.

Figure 6B:
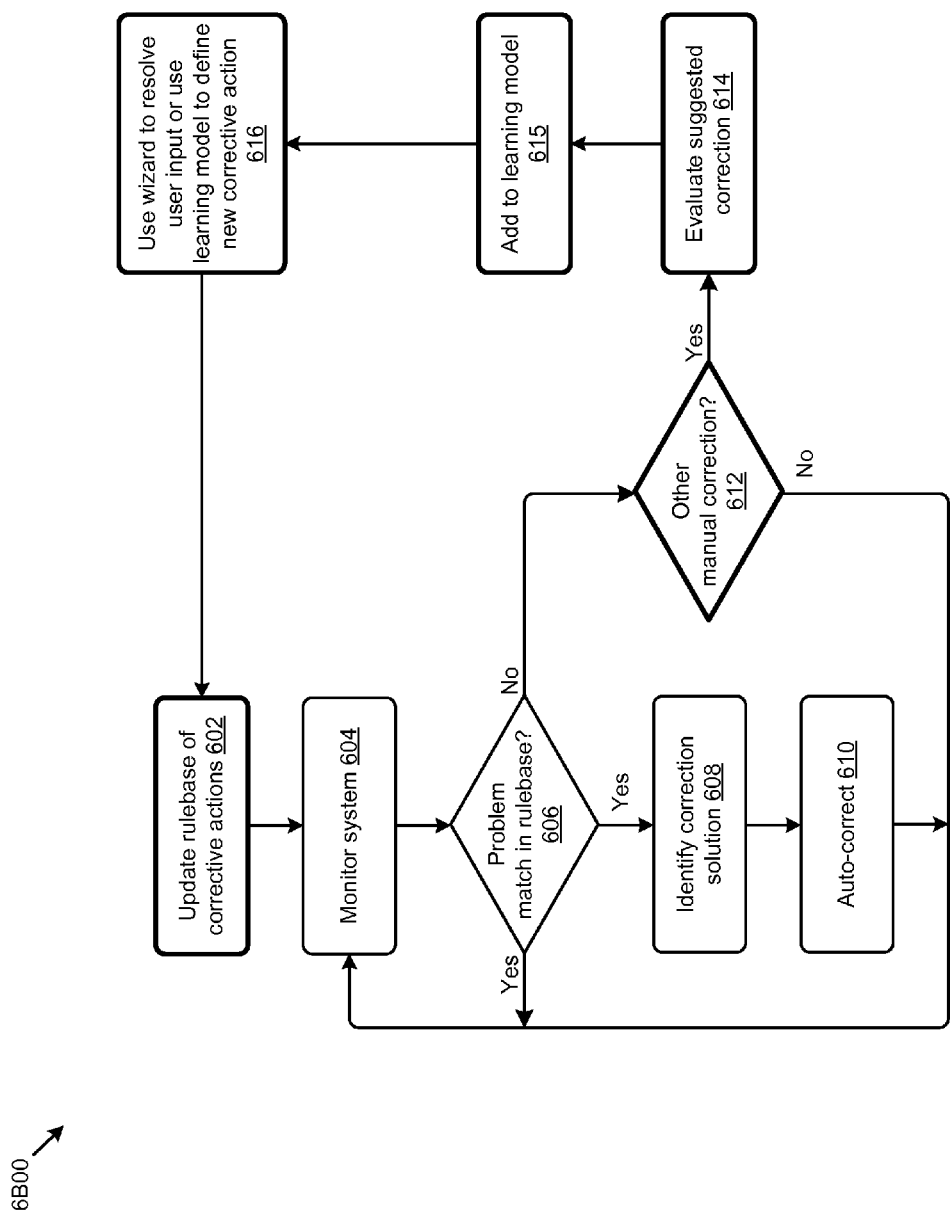
FIG. 6B exemplifies a rulebase update flow as used in systems supporting user-directed diagnostics and auto-correction, according to one embodiment.

FIG. 6B exemplifies a rulebase update flow 6B00 as used in systems supporting user-directed diagnostics and auto-correction. As an option, one or more instances of rulebase update flow 6B00 or any aspect thereof may be implemented in the context of the architecture and functionality of the embodiments described herein. Also, the rulebase update flow 6B00 or any aspect thereof may be implemented in any desired environment.

As shown in FIG. 6B, the rulebase update flow can be entered, for example, if the auto-correction flow of FIG. 6A cannot identify a corrective action from the rulebase. In such as case, a determination is made at decision 612 whether manual correction (or other types of non-auto-correction) may be applied to solve the problem. If so, then the additional correction may be performed at step 614. The following listing depicts some manual-correction scenarios (e.g., recommendations, needed configuration adjustments, etc.) as are exemplified in various embodiments. Strictly as examples, the manual-correction scenarios where a specific action is taken following detection of a condition can include:

Increase java memory when memory condition is detected.
Increase threads in kernel or metadata kernel when processing bottleneck is detected.
Increase number of network and kernel processes when networking bottleneck is detected.
Recommend a software patch when known bug is detected.
Recommend OS patch when a known issue is detected.

Under any of the above scenarios, one or more suggested corrections can be evaluated. Further the rulebase of corrective actions may be evaluated (see step 614) and possibly updated by the user, and/or added to an auto-learning process (see step 615). The update or addition may be used to define a new rule that will subsequently be processed as an auto-correction rule. In addition, the update may be implemented as an enhancement or update to an existing rule in the rulebase. An auto-learning process may be performed to enter the updates into the rulebase. In addition, a manual process may be performed to manually update the rulebase (see step 616).

An example of the format of a rulebase may be:
IF CURRENT JAVA PROCESS MEMORY >70% OF MAX ALLOCATED MEMORY THEN DO NOT ALLOW MORE USERS TO SIGN IN The foregoing is merely one example of how the rulebase can codify a corrective action so that excessive users do not pile on to a given server that is at risk of suffering from memory exhaustion condition. System administrators or other users can edit such a rule to suit the contingencies faced at that time. For example, during "Month End Processing" or "Quarter End Processing" a lot of users sign into the system. An admin may want to run the servers at a slightly heavier load than normal so the above mentioned rule may be modified in short time durations to accommodate more user load, as below:
IF CURRENT JAVA PROCESS MEMORY >85% OF MAX ALLOCATED MEMORY THEN DO NOT ALLOW MORE USERS TO SIGN IN In some cases a wizard interface may be used to walk the user through corrective actions. The wizard contains a knowledgebase of question and analysis rules to facilitate the search and identification processes. In some embodiments, the search wizard may be implemented as an expert system for identifying the appropriate corrective action. The aforementioned rulebase can be described as a set of rules, as is shown and discussed as pertains to FIG. 7A and FIG. 7B.

Figure 7A:
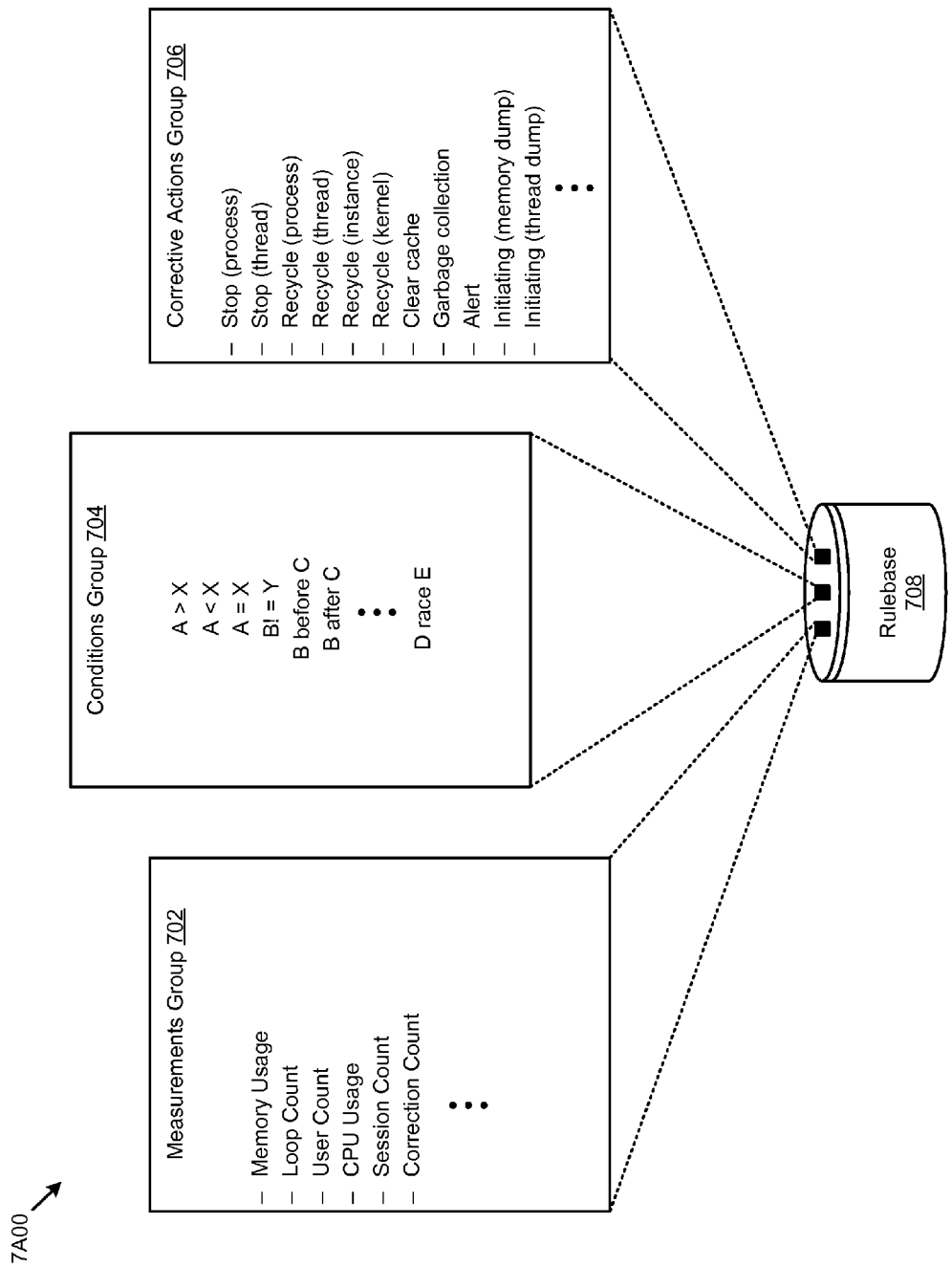
FIG. 7A exemplifies measurement, condition, and corrective action components of a rulebase as used in systems supporting user-directed diagnostics and auto-correction, according to one embodiment.

FIG. 7A exemplifies measurement, condition, and corrective action components of a rulebase 7A00 as used in systems supporting user-directed diagnostics and auto-correction. As an option, one or more instances of rulebase 7A00 or any aspect thereof may be implemented in the context of the architecture and functionality of the embodiments described herein. Also, the rulebase 7A00 or any aspect thereof may be implemented in any desired environment.

As shown in FIG. 7A, the rulebase comprises measurements to be taken (see measurements group 702), conditions to be evaluated (see conditions group 704), and corrective actions to be taken when a particular condition is determined to be present (see corrective actions group 706). Any condition may refer to any number of measurements, and any number of corrective actions may be taken based on the evaluation of a condition.

Any of the conditions can be defined with respect to any measurement. Further, any condition can be defined with respect to a threshold. Still further, a condition can specify temporal requirements (e.g., measurement M has been above threshold T for at least S seconds).

A condition can comprise a value test (e.g., A>X) and/or an equality/inequality test (e.g., B!=Y) and/or a temporal test (e.g., B occurs before C) or a race condition (e.g., D and E occur at the same measured moment).

The foregoing is exemplary of merely one scenario. Other scenarios involving thresholds and time requirements are given in the following:

Max or threshold of CPU usage for a period of time (not a single spike).
Max or threshold of memory usage for a period of time.
Max or threshold of disk usage.
Max or threshold of count of recycled kernels.
Max or threshold of number of running processes.
Max or threshold of per-process memory metrics.
Max or threshold of number of threads.
Max or threshold of caches.
Max or threshold of transactions.

Corrective actions (see corrective actions group 706) can comprise actions that can be taken under computer control. The shown action group includes actions to stop a process or thread or recycle a process or thread or instance or kernel; actions to clear a cache, initiate garbage collection, issue an alert, and/or to initiate a memory dump or to initiate a thread dump may also be taken. The term recycle in this context means to restart the process after a period of non-usage or inactivity (e.g., for the purpose for freeing its resources). Additional examples include:

Mark a kernel for recycling.
Capture diagnostics to logs files.
Notify a user that there is an issue and/or log off the user.
Leverage enterprise manager capabilities.
Invoke server manager operations.
Analyze kernel resource management.

Some of the actions to be taken or suggestions may involve solicitation of inputs from a user. Such input can be solicited at any point in time, possibly in an earlier initiated configuration session, or possibly in a session that is initiated responsive to a condition (e.g., see conditions group 704) being detected. The following FIG. 7B depicts a state machine design to implement auto-correction using a rulebase.

Figure 7B:
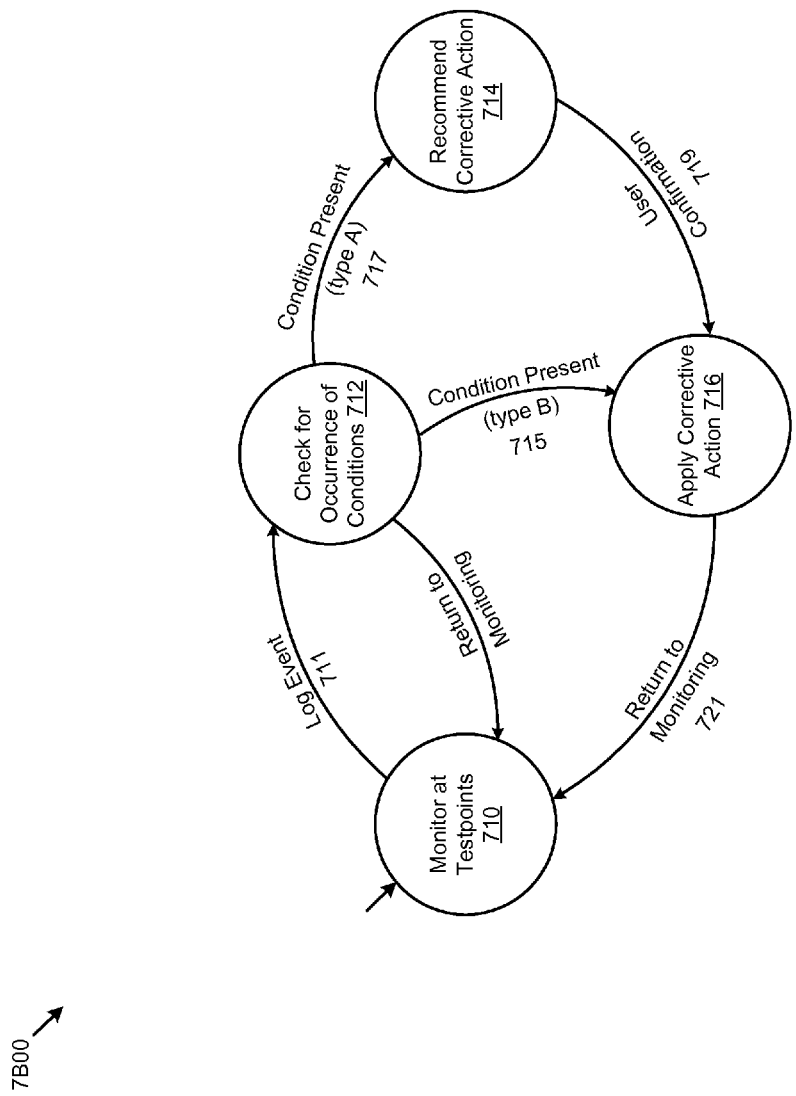
FIG. 7B presents a state machine implementation for auto-correction using a rulebase comprising measurements and conditions to determine a corrective action, according to one embodiment.

FIG. 7B presents a state machine implementation for auto-correction using a rulebase comprising measurements and conditions to determine a corrective action, according to one embodiment. The state machine implementation 7B00 implements a portion of a computer system. Any method, including the aforementioned configuration techniques can be used to configure a set of instrumentation components to monitor and take measurements at selected test points (see state 710). The monitoring activities can include logging of detected events (see transition 711), and the occurrence of a logged event can serve to enter a state to detect conditions corresponding to the measurements taken and/or logged (see state 712). When a condition is deemed as present (see transition 717) one or another next state (e.g., state 714 or state 716) is entered. In some cases (e.g., in the presence of a condition of a first type) the state to recommend corrective action is entered (see state 714). In some cases (e.g., in the presence of a condition of a second type) the state to apply one or more corrective actions is entered (see state 716).

In exemplary situations, a user might confirm a recommended action (see transition 719). In other situations, such as when a condition of the second type is detected (see transition 715) the state to apply corrective action might be entered autonomously (see state 716). As shown, after applying a corrective action, the state machine returns to a monitoring state (see transition 721).

The aforementioned corrective actions can be pre-configured in readiness for autonomous application. The pre-configured corrective action can be used when autonomously applying corrective action (see state 716). In other situations a corrective action can be configured upon the suggestion or recommendation of a particular corrective action (see state 714). As shown, a user can confirm or modify a corrective action configuration (see transition 719).

Figure 8A:
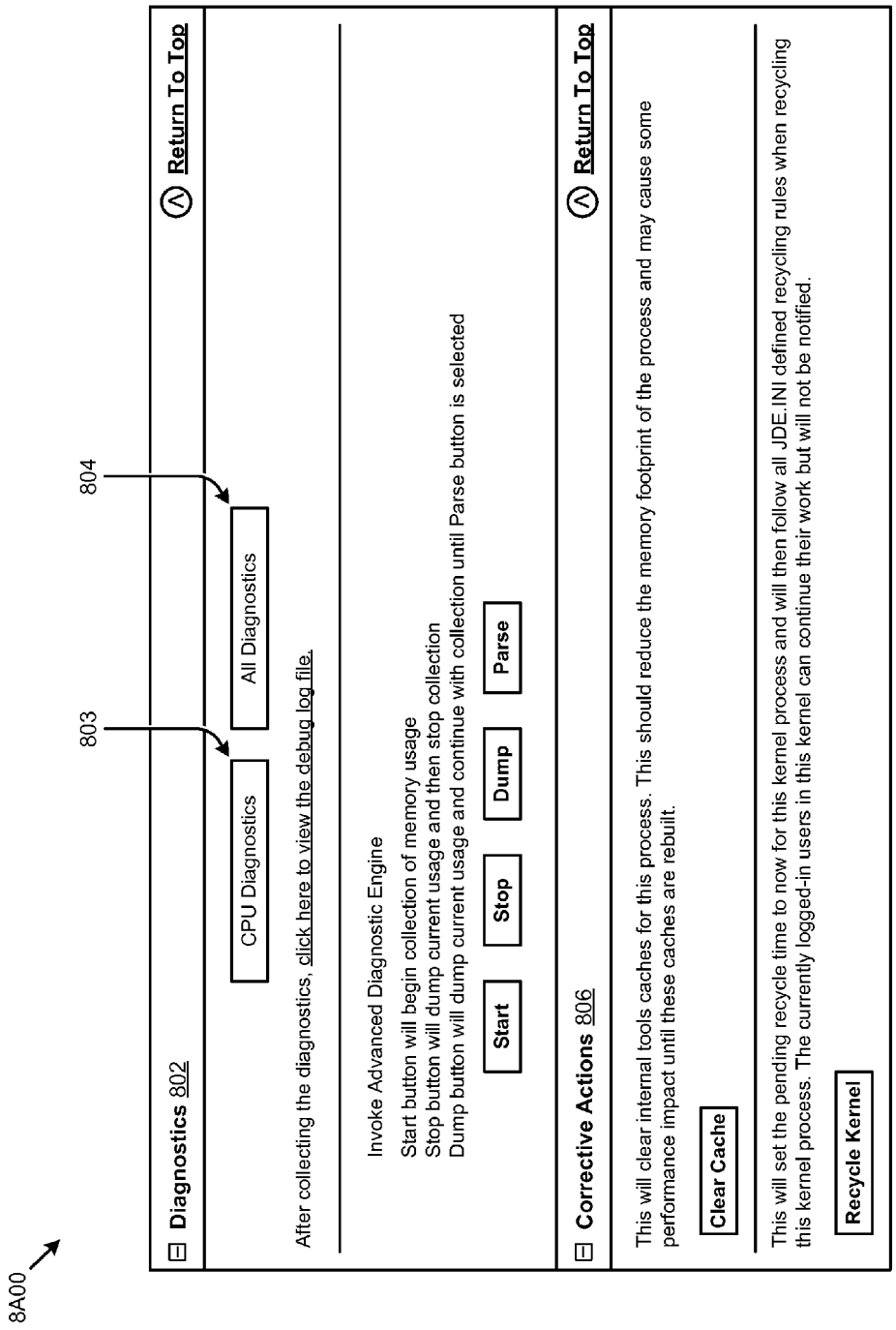
FIG. 8A exemplifies a corrective action configuration screen as used in systems supporting user-directed diagnostics and auto-correction, according to one embodiment.

FIG. 8A exemplifies a corrective action configuration screen 8A00 as used in systems supporting user-directed diagnostics and auto-correction. As an option, one or more instances of corrective action configuration screen 8A00 or any aspect thereof may be implemented in the context of the architecture and functionality of the embodiments described herein. Also, the corrective action configuration screen 8A00 or any aspect thereof may be implemented in any desired environment.

Figure 8D:
FIG. 8D exemplifies a log file management screen as used in systems supporting user-directed diagnostics and auto-correction, according to one embodiment.

As shown in FIG. 8A, the corrective action configuration screen comprises a diagnostics panel 802, which in turn can offer choices to a user. In corrective action configuration screen 8A00 certain diagnostics can be initiated by a button or other screen device (e.g., "CPU Diagnostics" button 803, "All Diagnostics" button 804). Further, an advanced diagnostics engine can be controlled by a screen device to "Start", "Stop", "Dump", or "Parse". Further, any one or more kernels can be recycled as a response to the suggestions in the corrective action configuration screen 8A00. Various corrective actions pertaining to kernel recycling can be taken, and the following FIG. 8B, FIG. 8C, and FIG. 8D show and describe some possible kernel recycling actions.

FIG. 8B exemplifies a kernel recycle schedule configuration screen 8B00 as used in systems supporting user-directed diagnostics and auto-correction. As an option, one or more instances of kernel recycle schedule configuration screen 8B00 or any aspect thereof may be implemented in the context of the architecture and functionality of the embodiments described herein. Also, the kernel recycle schedule configuration screen 8B00 or any aspect thereof may be implemented in any desired environment.

As shown in FIG. 8B, the kernel recycle schedule configuration screen comprises several regions, within which regions kernel recycling options can be presented for user interaction. In this exemplary kernel recycle schedule configuration screen, the user is offered the possibility to schedule based on a calendar schedule (see panel 820) or based on a kernel uptime. Additionally, kernel timeouts can be configured (see panel 830). Timeouts can be set separately as applies to an inactive user (see timeout setting 842) and/or as applies to a forced exit timeout (see timeout setting 844).

FIG. 8C exemplifies a database connection cache configuration screen 8C00 as used in systems supporting user-directed diagnostics and auto-correction. As an option, one or more instances of database connection cache configuration screen 8C00 or any aspect thereof may be implemented in the context of the architecture and functionality of the embodiments described herein. Also, the database connection cache configuration screen 8C00 or any aspect thereof may be implemented in any desired environment.

As shown in FIG. 8C, the database connection cache configuration screen comprises a connection cache panel 850 (e.g., for clearing caches on specific instances) and a pooled database connection panel 856 (e.g., for managing connections assigned to a pool). This screen can be used to tune the number of database connections (which consume memory and system resources) to a level optimal for the system and number of users.

FIG. 8D exemplifies a log file management screen 8D00 as used in systems supporting user-directed diagnostics and auto-correction. As an option, one or more instances of log file management screen 8D00 or any aspect thereof may be implemented in the context of the architecture and functionality of the embodiments described herein. Also, the log file management screen 8D00 or any aspect thereof may be implemented in any desired environment.

As shown in FIG. 8D, the log file management screen comprises a log file panel 860, which in turn offers various user-level configuration options. This screen, specifically the user-level configuration option, can be used to write a message to a log file that allows a user to mark log files for later analysis and synchronization.

As a user convenience, the logic underlying the log file management screen displays log files that are active. For example, the underlying log file management screen displays log files that have been written to within the most recent timeframe (e.g., within an hour, within a day, within 48 hours, etc.).

Figure 9A:
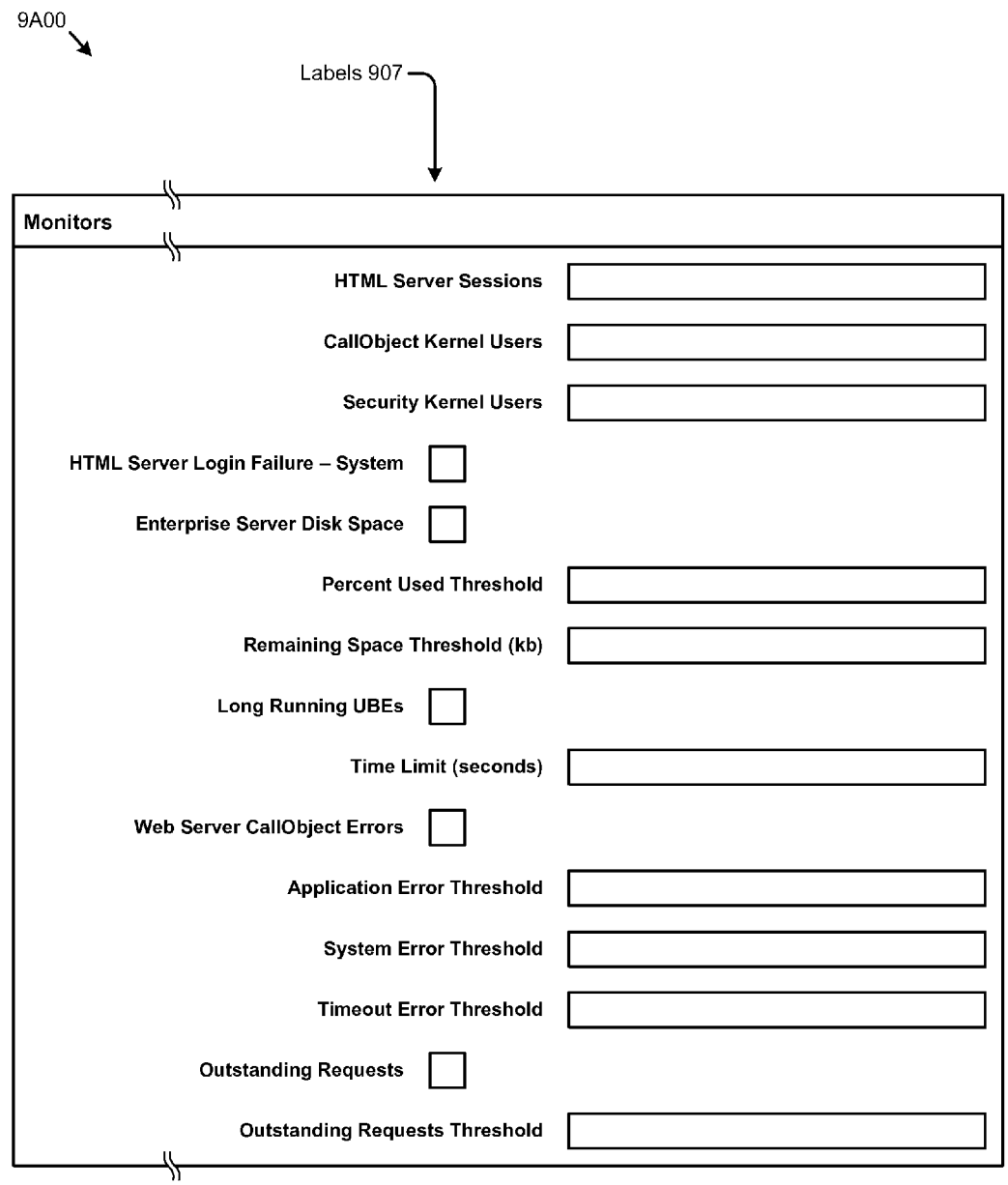
FIG. 9A shows a user-configurable limit interface as used in systems supporting user-directed diagnostics and auto-correction, according to one embodiment.

FIG. 9A shows a user-configurable limit interface 9A00 as used in systems supporting user-directed diagnostics and auto-correction. As an option, one or more instances of user-configurable limit interface 9A00 or any aspect thereof may be implemented in the context of the architecture and functionality of the embodiments described herein. Also, the user-configurable limit interface 9A00 or any aspect thereof may be implemented in any desired environment.

As shown in FIG. 9A, the user-configurable limit interface comprises limits and/or thresholds that can be used by any of the foregoing monitoring capabilities and/or corrective action capabilities. The user-configurable limit interface 9A00 presents labels (e.g., "HTML Server Sessions", "CalObject Kernel Users", "Security Kernel Users", etc.) and offers a corresponding entry area (e.g., a text box, as shown) for a user to enter a monitor value. Strictly as examples of limits and thresholds, the semantics of a monitor limit value might refer to a number of HTML server sessions (e.g., a maximum number, over which a monitor task will emit an alert), and/or the semantics of a monitor threshold value might refer to a number or percentage or ratio to refer to a threshold for disk space usage, a threshold for error message collection, and/or numbers or percentages or ratios pertaining to any other measurable aspect of the monitored system. The labels 907 might be retrieved from a repository, or might be derived from one or more aspects of an instrumentation component, or a label might be determined based on the name of a corresponding instrumentation component.

Figure 9B:
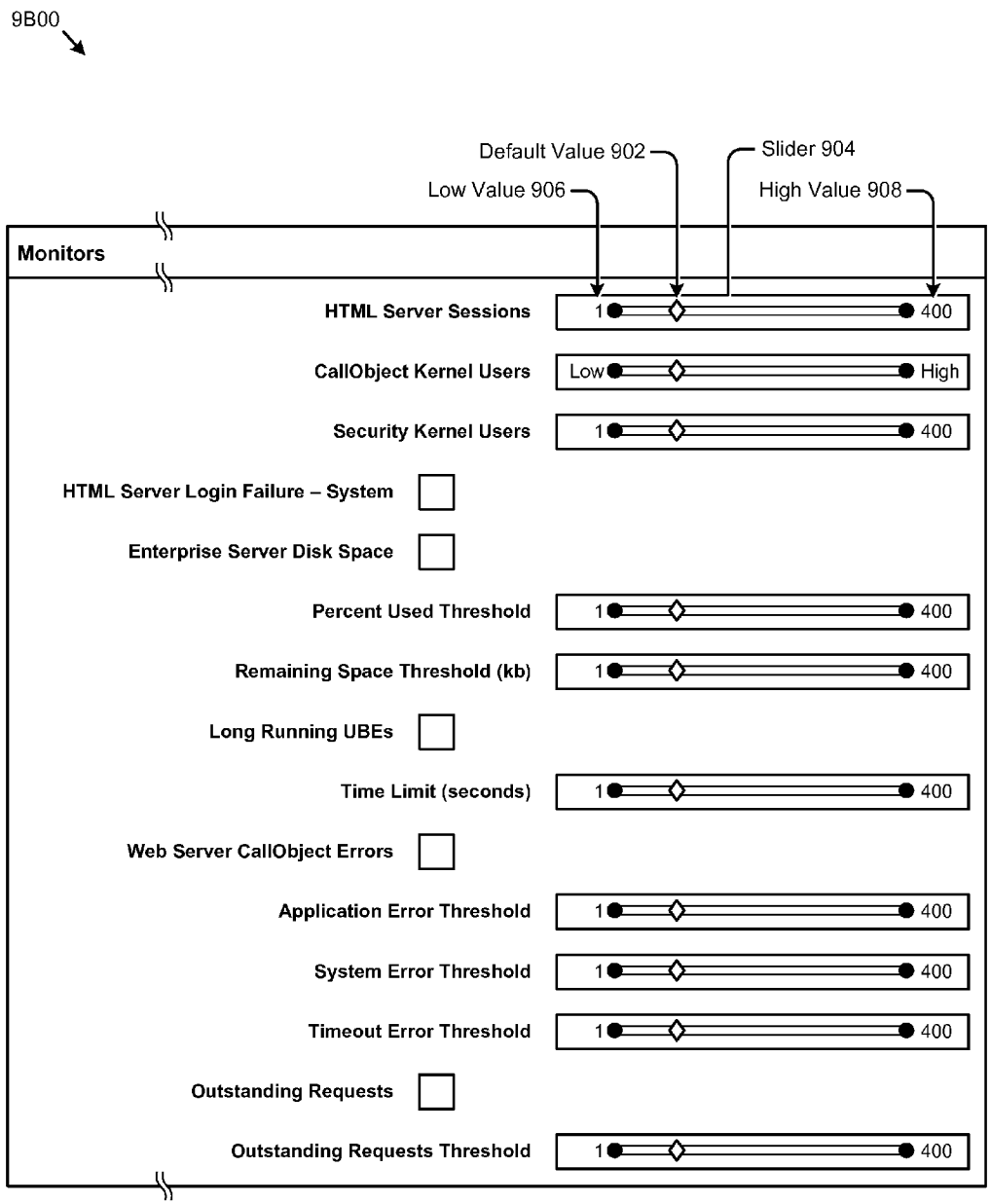
FIG. 9B shows a series of user-configurable threshold sliders as used in systems supporting user-directed diagnostics and auto-correction, according to one embodiment.

FIG. 9B shows a series of user-configurable threshold sliders 9B00 as used in systems supporting user-directed diagnostics and auto-correction. As an option, one or more instances of user-configurable threshold sliders 9B00 or any aspect thereof may be implemented in the context of the architecture and functionality of the embodiments described herein. Also, the user-configurable threshold sliders 9B00 or any aspect thereof may be implemented in any desired environment.

As shown in FIG. 9B, the user-configurable threshold sliders comprises a series of slider-based thresholds such that a slider is presented with a pre-calculated low value 906, a high value 908, and a default value 902. The user can use the slider 904 to move from the default value or previously set value to any other value between the low value and high value.

In some cases a threshold can be associated with a script, and a pull-down menu or other screen device can be presented to facilitate user selection of a script to be associated with a particular threshold. Under computer control, the associated script can be invoked when its corresponding threshold is met or exceeded.

Figure 9C:
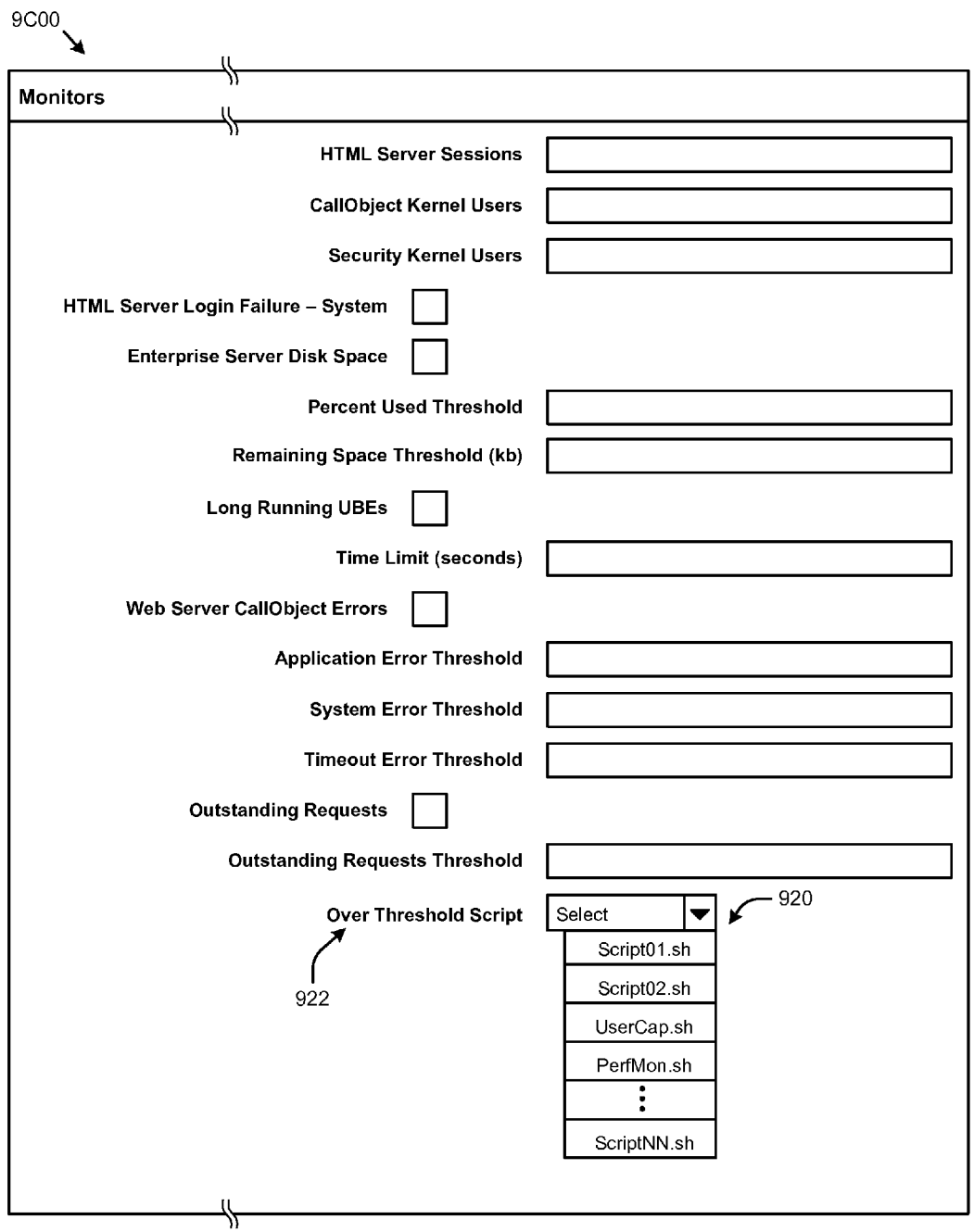
FIG. 9C shows a user-configurable script invocation screen as used in systems supporting user-directed diagnostics and auto-correction, according to one embodiment.

FIG. 9C shows a user-configurable script invocation screen 9C00 as used in systems supporting user-directed diagnostics and auto-correction. As an option, one or more instances of user-configurable script invocation screen 9C00 or any aspect thereof may be implemented in the context of the architecture and functionality of the embodiments described herein. Also, the user-configurable script invocation screen 9C00 or any aspect thereof may be implemented in any desired environment.

In the example of FIG. 9C, the user-configurable script invocation screen comprises a script invocation pull-down menu 920 that is associated with the shown outstanding requests threshold value 922. Under computer control, which may be enabled or disabled by a user, the script selected via the pull-down menu can be invoked when its corresponding threshold is met or exceeded.

Figure 10:
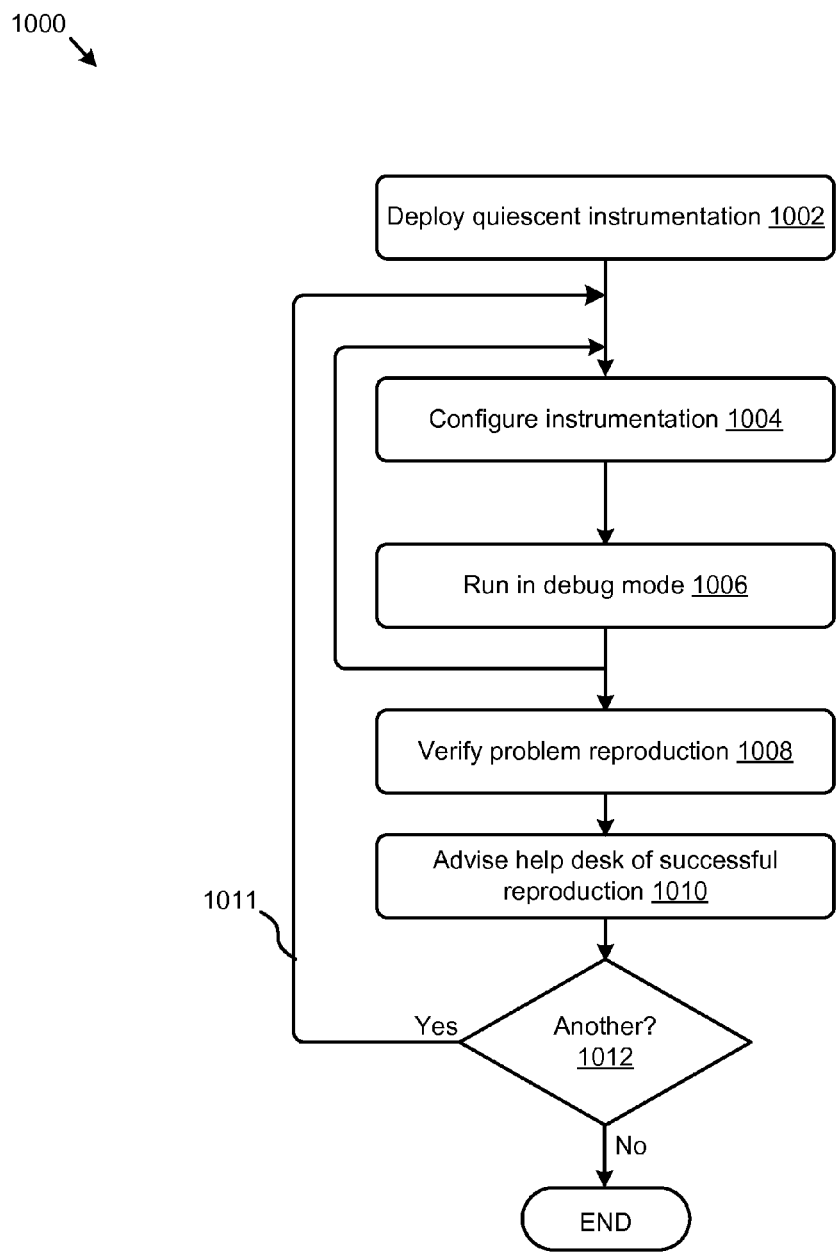
FIG. 10 exemplifies a problem reproduction use model flow for operating systems supporting user-directed diagnostics and auto-correction, according to one embodiment.

FIG. 10 exemplifies a problem reproduction use model flow 1000 for operating systems supporting user-directed diagnostics and auto-correction. As an option, one or more instances of problem reproduction use model flow 1000 or any aspect thereof may be implemented in the context of the architecture and functionality of the embodiments described herein. Also, the problem reproduction use model flow 1000 or any aspect thereof may be implemented in any desired environment.

FIG. 10 presents one possible use model. The use model is depicted as a flow, which flow is entered upon deployment of quiescent instrumentation (see step 1002). The deployed instrumentation may be deployed in an initial quiescent state or it may be deployed to begin monitoring immediately. Indeed, in some cases, specific monitored signals and events may vary wildly and/or cyclically, and desired measurements are based on an average of a time window. The deployed instrumentation can be configured by a user at any moment in time (see step to configure instrumentation 1004) and a user can initiate running in debug mode (see step 1006). Running in debug mode can persist for any length of time, and a return to the step to configure instrumentation 1004 can occur at any moment in time. At some moment in time any of the measurements (see measurements group 702) might be evaluated by a condition (see conditions group 704) and a search-for problem might be detected. At such a moment in time, the configuration (e.g., what is monitored, what is logged, what is auto-corrected) might have successfully reproduced the problem or behavior that the user wanted to capture. The capture can be verified by the user (see step 1008) and the captured measurements, detected conditions, detected events, alerts, etc. can be provided to a help desk (see step 1010).

In some situations, a problem is caused by multiple variances, any one of which can be separately observed and reproduced. In such a case, the use model supports a decision to return to configure instrumentation (see decision 1012), and the use model flow can proceed again from the top of loop 1011.

ADDITIONAL EMBODIMENTS OF THE DISCLOSURE

Additional Practical Application Examples

Figure 11:
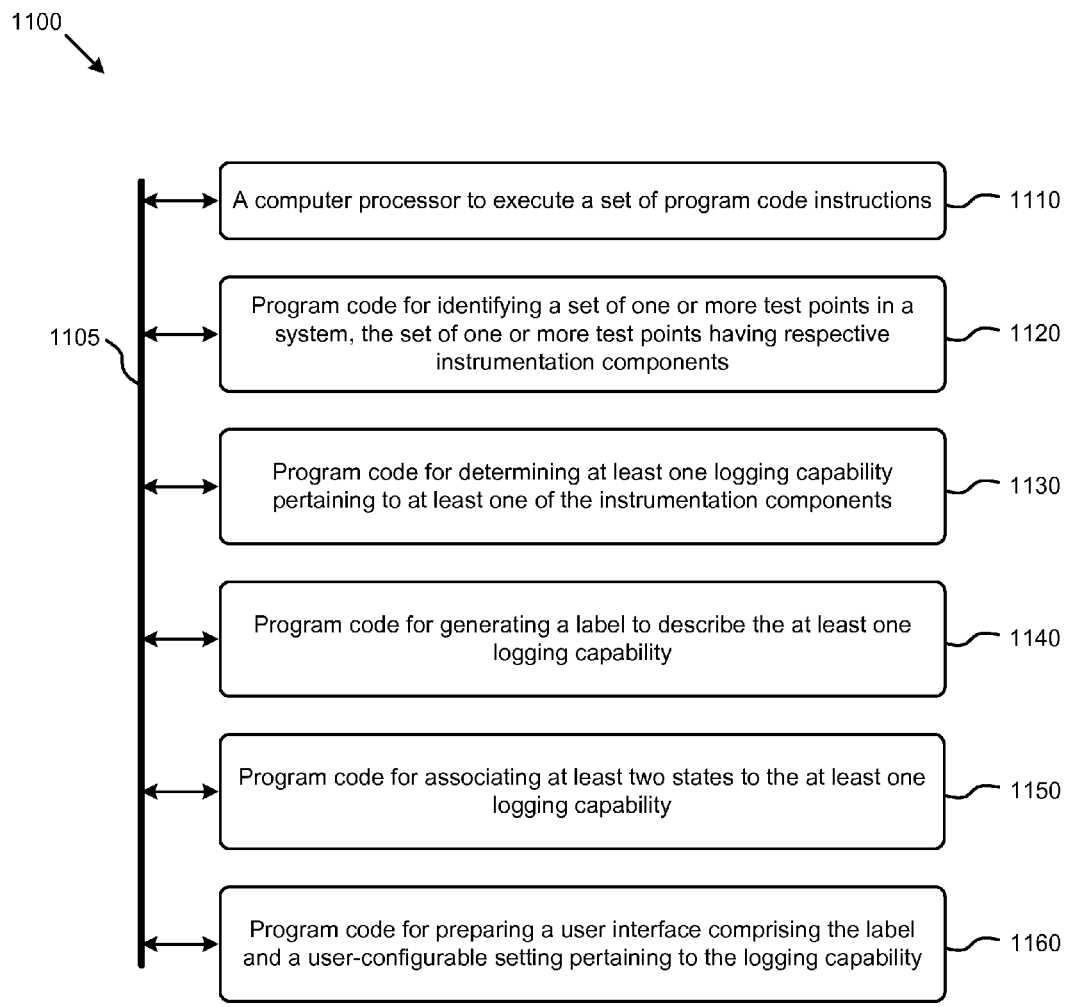
FIG. 11 is a block diagram of a system for user-directed logging, according to some embodiments.

FIG. 11 is a block diagram of a system for user-directed logging, according to some embodiments. FIG. 11 presents a block diagram of a system for implementing all or portions of any of the embodiments described herein. As shown, system 1100 comprises at least one processor and at least one memory, the memory serving to store program instructions corresponding to the operations of the system. An operation can be implemented in whole or in part using program instructions accessible by a module. The modules are connected to a communication path 1105, and any operation can communicate with other operations over communication path 1105. The modules of the system can, individually or in combination, perform method operations within system 1100. Any operations performed within system 1100 may be performed in any order unless as may be specified in the claims.

The embodiment of FIG. 11 implements a portion of a computer system, shown as system 1100, comprising a computer processor to execute a set of program code instructions (see module 1110) and modules for accessing memory to hold program code instructions to perform: identifying a set of one or more test points in a system, the set of one or more test points having respective instrumentation components (see module 1120); determining at least one logging capability pertaining to at least one of the instrumentation components (see module 1130); generating a label to describe the at least one logging capability (see module 1140); associating at least two states to the at least one logging capability (see module 1150); and preparing a user interface comprising the label and a user-configurable setting pertaining to the logging capability (see module 1160).

Figure 12:
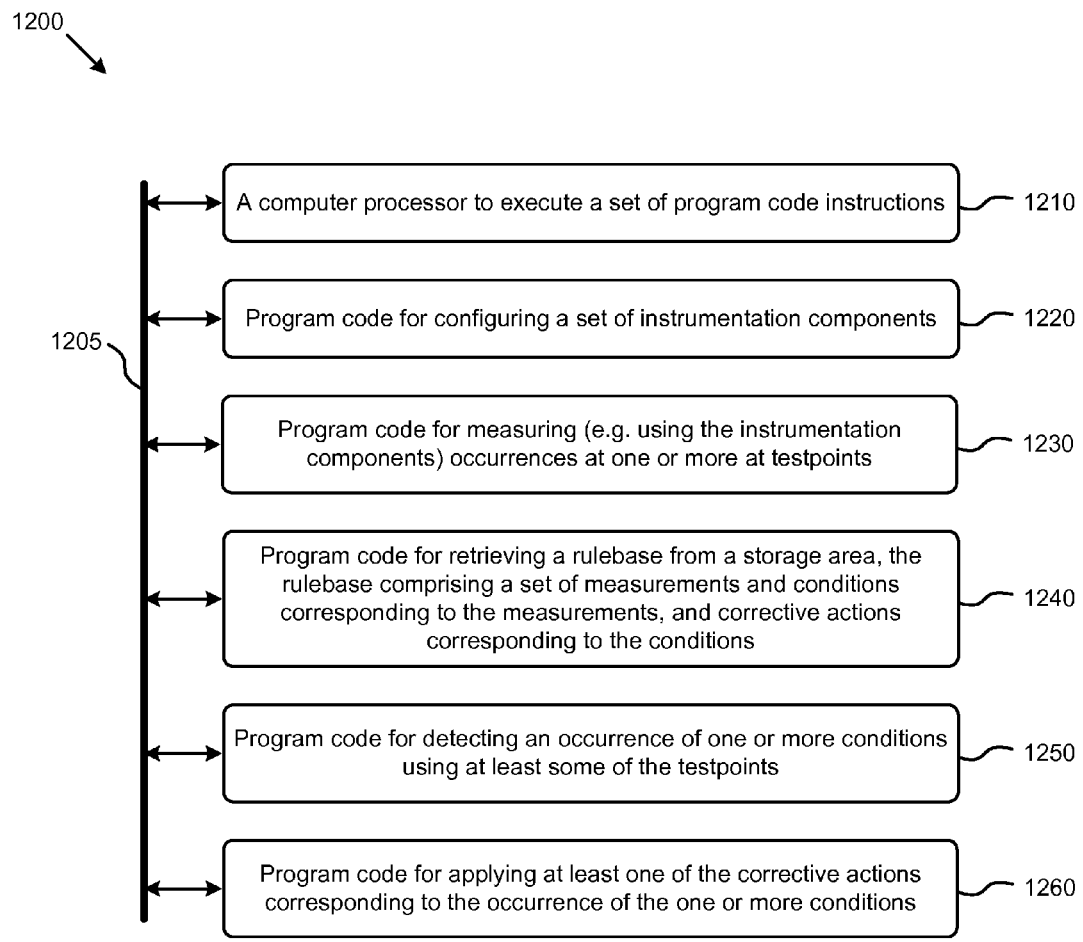
FIG. 12 is a block diagram of a system for user-directed diagnostics and auto-correction, according to some embodiments.

FIG. 12 is a block diagram of a system for user-directed diagnostics and auto-correction, according to some embodiments. FIG. 12 presents a block diagram of a system for implementing all or portions of any of the embodiments described herein.

As shown, system 1200 comprises at least one processor and at least one memory, the memory serving to store program instructions corresponding to the operations of the system. An operation can be implemented in whole or in part using program instructions accessible by a module. The modules are connected to a communication path 1205, and any operation can communicate with other operations over communication path 1205. The modules of the system can, individually or in combination, perform method operations within system 1200. Any operations performed within system 1200 may be performed in any order unless as may be specified in the claims.

The embodiment of FIG. 12 implements a portion of a computer system, shown as system 1200, comprising a computer processor to execute a set of program code instructions (see module 1210) and modules for accessing memory to hold program code instructions to perform: configuring a set of instrumentation components (see module 1220); measuring using the instrumentation component occurrences at one or more at testpoints (see module 1230), retrieving a rulebase from a storage area, the rulebase comprising a set of measurements and conditions corresponding to the measurements, and corrective actions corresponding to the conditions (see module 1240); detecting an occurrence of one or more conditions using at least some of the testpoints (see module 1250); and applying at least one of the corrective actions corresponding to the occurrence of the one or more conditions (see module 1260).

SYSTEM ARCHITECTURE OVERVIEW

Additional System Architecture Examples

Figure 13:
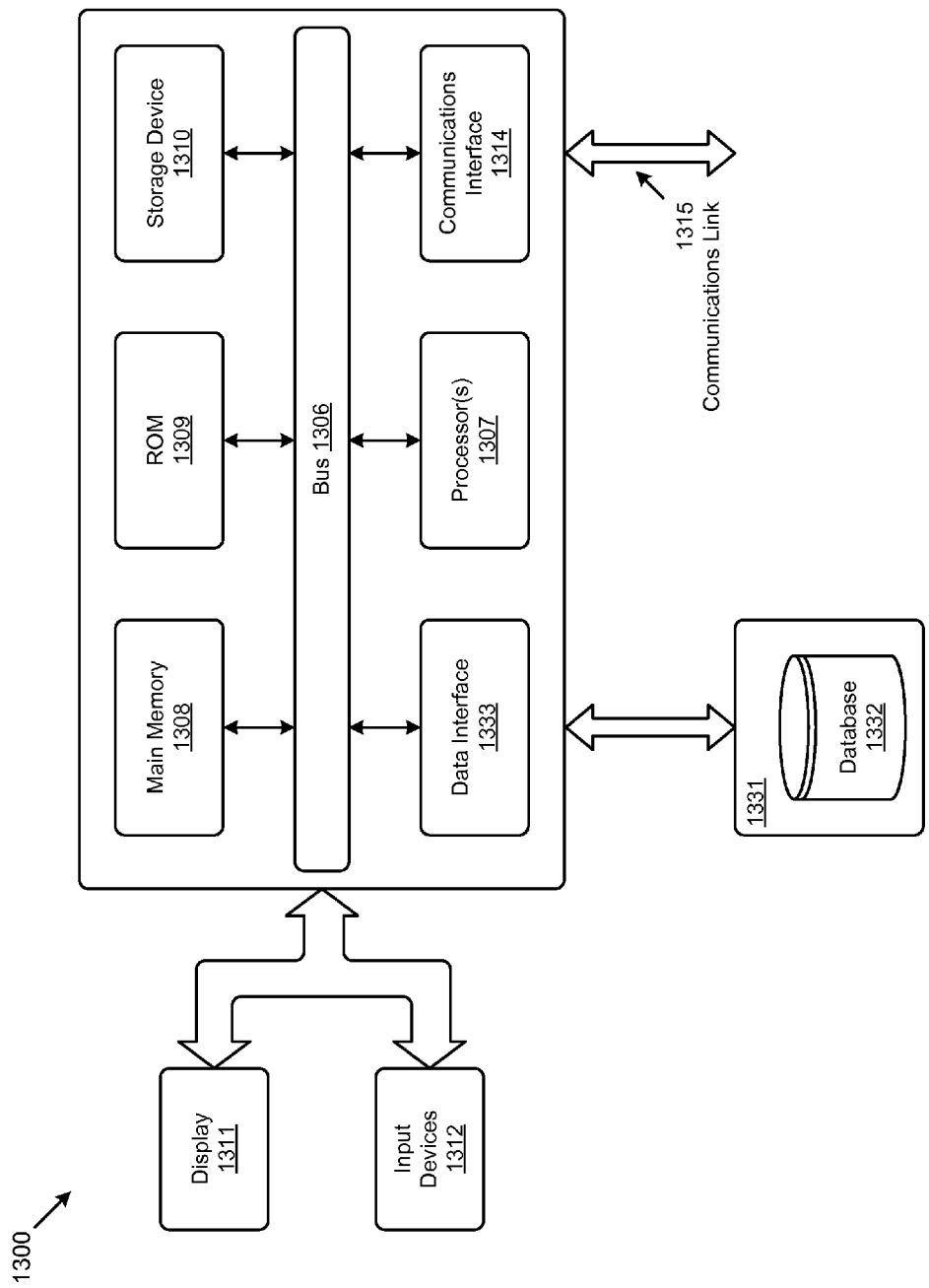
FIG. 13 depicts a block diagram of an instance of a computer system suitable for implementing embodiments of the present disclosure, and/or for use in the herein-described environments.

FIG. 13 depicts a block diagram of an instance of a computer system 1300 suitable for implementing embodiments of the present disclosure. Computer system 1300 includes a bus 1306 or other communication mechanism for communicating information, which interconnects subsystems and devices such as a processor 1307, a system memory (e.g., main memory 1308, or an area of random access memory RAM), a static storage device (e.g., ROM 1309), a storage device 1310 (e.g., magnetic or optical), a data interface 1333, a communication interface 1314 (e.g., modem or Ethernet card), a display 1311 (e.g., CRT or LCD), input devices 1312 (e.g., keyboard, cursor control), and an external data repository 1331.

According to one embodiment of the disclosure, computer system 1300 performs specific operations by processor 1307 executing one or more sequences of one or more instructions contained in system memory. Such instructions may be read into system memory from another computer readable/usable medium such as a static storage device or a disk drive. In alternative embodiments, hard-wired circuitry may be used in place of or in combination with software instructions to implement the disclosure. Thus, embodiments of the disclosure are not limited to any specific combination of hardware circuitry and/or software. In one embodiment, the term "logic" shall mean any combination of software or hardware that is used to implement all or part of the disclosure.

The term "computer readable medium" or "computer usable medium" as used herein refers to any medium that participates in providing instructions to processor 1307 for execution. Such a medium may take many forms including, but not limited to, non-volatile media and volatile media. Non-volatile media includes, for example, optical or magnetic disks such as disk drives or tape drives. Volatile media includes dynamic memory such as a RAM memory.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory medium from which a computer can read data.

In an embodiment of the disclosure, execution of the sequences of instructions to practice the disclosure is performed by a single instance of the computer system 1300. According to certain embodiments of the disclosure, two or more instances of computer system 1300 coupled by a communications link 1315 (e.g., LAN, PTSN, or wireless network) may perform the sequence of instructions required to practice the disclosure in coordination with one another.

Computer system 1300 may transmit and receive messages, data, and instructions including programs (e.g., application code), through communications link 1315 and communication interface 1314. Received program code may be executed by processor 1307 as it is received and/or stored in storage device 1310 or any other non-volatile storage for later execution. Computer system 1300 may communicate through a data interface 1333 to a database 1332 on an external data repository 1331. Data items in database 1332 can be accessed using a primary key (e.g., a relational database primary key). A module as used herein can be implemented using any mix of any portions of the system memory and any extent of hard-wired circuitry including hard-wired circuitry embodied as a processor 1307. Some embodiments include one or more special-purpose hardware components (e.g., power control, logic, sensors, etc.).

Various environment in which embodiments of the disclosure operate may include local area networks (LANs)/wide area networks (WANs), wireless networks, client devices (e.g., user stations). The overall network including any sub-networks and/or wireless networks are in communication with, and enables communication between each of the components the environment.

Instances of client devices may include virtually any computing device capable of communicating over a network to send and receive information, including instant messages, performing various online activities or the like. It should be recognized that more or fewer client devices may be included within a system such as described herein, and embodiments are therefore not constrained by the number or type of client devices employed.

Devices that may operate as client devices may include devices that can connect using a wired or wireless communications medium such as personal computers, servers, multiprocessor systems, microprocessor-based or programmable consumer electronics, network PCs or the like. In some embodiments, client devices may include virtually any portable computing device capable of connecting to another computing device and receiving information such as a laptop computer, a smart phone, a tablet computer, or the like. Portable or mobile computer devices are may also include or operate in conjunction with other portable devices such as cellular telephones, display pagers, radio frequency (RF) devices, infrared (IR) devices, personal digital assistants (PDAs), handheld computers, wearable computers integrated devices combining one or more of the preceding devices and the like. As such, client devices can range widely in terms of capabilities and features. Moreover, client devices may provide access to various computing applications including a browser or other web-based applications. A web-enabled client device may include a browser application that is configured to receive and to send web pages, web-based messages and the like. The browser application may be configured to receive and display graphics, text, multimedia and the like, employing virtually any web-based language including a wireless application protocol messages (WAP) and the like. In one embodiment, the browser application is enabled to employ handheld device markup language (HDML), wireless markup language (WML), WMLScript, JavaScript, standard generalized markup language (SGML), HyperText markup language (HTML), eXtensible markup language (XML) and the like, to display and send a message. In one embodiment, a user of the client device may employ the browser application to perform various activities over a network (online). However, another application may also be used to perform various online activities.

Client devices may include at least one client application that is configured to receive and/or send data between another computing device. The client application may include a capability to provide send and/or receive content or the like. The client application may further provide information that identifies itself including a type, capability, name or the like. In one embodiment, a client device may uniquely identify itself through any of a variety of mechanisms including a phone number, mobile identification number (MIN), an electronic serial number (ESN), or other mobile device identifier. The information may also indicate a content format that the mobile device is enabled to employ. Such information may be provided in a network packet or the like, sent between other client devices, or sent between other computing devices.

Client devices may be further configured to include a client application that enables an end-user to log into an end-user account that may be managed by another computing device. Such end-user accounts, in one non-limiting example, may be configured to enable the end-user to manage one or more online activities including, in one non-limiting example, search activities, social networking activities, browse various websites, communicate with other users, participate in gaming, interact with various applications or the like. However, participation in online activities may also be performed without logging into the end-user account.

A wireless communication capability is configured to couple client devices and other components with network. Wireless network may include any of a variety of wireless sub-networks that may further overlay stand-alone and/or ad-hoc networks and the like, to provide an infrastructure-oriented connection for client devices. Such sub-networks may include mesh networks, wireless LAN (WLAN) networks, cellular networks and the like. In one embodiment, the system may include more than one wireless network.

A wireless network may further include an autonomous system of terminals, gateways, routers, mobile network edge devices and the like which may be connected by wireless radio links, etc. Connections may be configured to move freely and randomly and organize themselves arbitrarily such that the topology of a wireless network may change rapidly. A wireless network may further employ a plurality of access technologies including AMPS and/or second generation (2G), and/or third generation (3G), and/or fourth generation (4G) generation radio access for cellular systems, WLAN, wireless router (WR) mesh and the like. Any of the foregoing networks can be configured to couple network devices with other computing devices and communication can include communicating between the Internet. In some situations communication is carried out using combinations of LANs, WANs, as well as direct connections such as through a universal serial bus (USB) port, other forms of computer readable media. On an interconnected set of LANs, including those based on differing architectures and protocols, a router acts as a link between LANs, enabling messages to be sent from one to another. In addition, communication links within LANs may include twisted wire pair or coaxial cable, while communication links between networks may use analog telephone lines, full or fractional dedicated digital lines including T1, T2, T3, and T4, and/or other carrier mechanisms including, for example, E-carriers, integrated services digital networks (ISDNs), digital subscriber lines (DSLs), wireless links including satellite links, or other communications links known to those skilled in the art. Moreover, communication links may further employ any of a variety of digital signaling technologies including, without limit, for example, DS-0, DS-1, DS-2, DS-3, DS-4, OC-3, OC-12, OC-48 or the like. Furthermore, remote computers and other related electronic devices could be remotely connected to either LANs or WANs via a modem and temporary telephone link. In one embodiment, a network may be configured to transport information of an Internet protocol (IP). In some cases, communication media carries computer readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative sense rather than in a restrictive sense.

What is claimed is:

1. A computer-implemented method comprising:
providing an application system accessible by a plurality of users at the same time, the application system comprising one or more applications or one or more application modules, at least one of the one or more applications or one or more application modules is operable in both a first mode and a second mode at the same time for different users, the first mode comprising a production mode which does not include user initiated logging and the second mode comprising a debug mode that includes user initiated logging initiated on a user-by-user basis;
performing, in response to a user invoking the second mode and a corresponding user-initiated logging specification that comprises a type and amount module of the one or more applications or the one or more application modules, the application or application module operated in the first mode and the second mode by different users at the same time, the second mode performing user-directed diagnostics implemented by:
configuring a set of instrumentation components for the user based at least in part on one or more aspects of the user-initiated logging specification,
measuring, using a set of instrumentation components, at a set of one or more testpoints,
retrieving a rulebase from a storage area, the rulebase comprising one or more conditions and corresponding corrective actions;
detecting an occurrence of the one or more conditions using at least some of the testpoints; and
applying at least one of the corrective actions corresponding to the occurrence of the one or more conditions.

2. The method of claim 1, wherein the set of instrumentation components comprise at least one of, a sniffer component, or an interceptor component.

3. The method of claim 1, wherein the set of one or more testpoints comprise at least one of, a hardware test point, and a software test point.

4. The method of claim 3, wherein the set of one or more testpoints comprise an interception of at least one of, a call to database engine, a call to an in memory data storage, and a call to a middleware component.

5. The method of claim 3, wherein at least one of the conditions corresponding to the measurements comprises at least one of, a memory limit detection, a network bottleneck detection, a processing bottleneck detection, and a condition pertaining to a known bug.

6. The method of claim 1, wherein at least one of the corrective actions comprises at least one of, taking an action to increase a memory limit, recycle a process, clear a cache, recommend a network configuration, recommend a software patch, invoking a video capture session, invoke a memory defragmentation process, and recommend an OS patch.

7. The method of claim 1, further comprising determining whether a particular condition has a matching rule in the rulebase.

8. The method of claim 7, further comprising implementing a correction based on the matching rule in the rulebase.

9. The method of claim 8, further comprising implementing a correction based on at least one aspect not found in the matching rule in the rulebase.

10. The method of claim 8, further comprising adding least one aspect not found in the matching rule to a learning model.

11. The method of claim 10, further comprising using the learning model to determine a new corrective action.

12. A computer program product, embodied in a non-transitory computer readable medium, the computer readable medium having stored thereon a sequence of instructions which, when executed by a processor causes the processor to execute a process, the process comprising:
providing an application system accessible by a plurality of users at the same time, the application system comprising one or more applications or one or more application modules, at least one of the one or more applications or one or more application modules is operable in both a first mode and a second mode at the same time for different users, the first mode comprising a production mode which does not include user initiated logging and the second mode comprising a debug mode that includes user initiated logging initiated on a user-by-user basis;
performing, in response to a user invoking the second mode and a corresponding user-initiated logging specification that comprises a type and amount module of the one or more applications or the one or more application modules, the application or application module operated in the first mode and the second mode by different users at the same time, the second mode performing user-directed diagnostics implemented by:
configuring a set of instrumentation components for the user based at least in part on one or more aspects of the user-initiated logging specification,
measuring, using a set of instrumentation components, at a set of one or more testpoints,
retrieving a rulebase from a storage area, the rulebase comprising one or more conditions and corresponding corrective actions;
detecting an occurrence of the one or more conditions using at least some of the testpoints; and
applying at least one of the corrective actions corresponding to the occurrence of the one or more conditions.

13. The computer program product of claim 12, wherein the set of instrumentation components comprise at least one of, a sniffer component, or an interceptor component.

14. The computer program product of claim 12, wherein the set of one or more testpoints comprise at least one of, a hardware test point, and a software test point.

15. The computer program product of claim 12, wherein the set of one or more testpoints comprise an interception of at least one of, a call to database engine, a call to an in memory data storage, and a call to a middleware component.

16. The computer program product of claim 12, wherein at least one of the conditions corresponding to the measurements comprises at least one of, a memory limit detection, a network bottleneck detection, a processing bottleneck detection, and a condition pertaining to a known bug.

17. The computer program product of claim 12, wherein at least one of the corrective actions comprises at least one of, taking an action to increase a memory limit, recycle a process, clear a cache, recommend a network configuration, recommend a software patch, invoking a video capture session, invoke a memory defragmentation process, and recommend an OS patch.

18. The computer program product of claim 12, further comprising determining whether a particular condition has a matching rule in the rulebase.

19. A system accessible by a plurality of users at the same time, comprising:
   one or more applications or one or more application modules, at least one of the one or more applications or one or more application modules is operable in both a first mode and a second mode at the same time for different users, the first mode comprising a production mode which does not include user initiated logging and the second mode comprising a debug mode that includes user initiated logging initiated on a user-by-user basis, wherein in response to a user invoking the second mode and a corresponding user-initiated logging specification that comprises a type and amount of data to be logged, the system is to perform user-directed diagnostics on an application or application module of the one or more applications or the one or more application modules, the application or application module operated in the first mode and the second mode by different users at the same time, the second mode performing user-directed diagnostics implemented;
   a user-controllable diagnostics configuration module to configure a set of instrumentation components for the user based at least in part on one or more aspects of a user-initiated logging specification;
   instrumentation components to take measurements at a set of one or more testpoints,
   an auto-correction configuration user interface to store a rulebase into a storage area, the rulebase comprising one or more conditions and corresponding corrective actions; and
   an auto-correction engine to detect an occurrence of the one or more conditions using at least some of the testpoints, and to apply at least one of the corrective actions corresponding to the occurrence of the one or more conditions.

20. The system of claim 19, wherein at least one of the corrective actions comprises at least one of, taking an action to increase a memory limit, recycle a process, clear a cache, recommend a network configuration, recommend a software patch, invoking a video capture session, invoke a memory defragmentation process, and recommend an OS patch.

* * * * *

UNITED STATES PATENT AND TRADEMARK OFFICE
CERTIFICATE OF CORRECTION

PATENT NO.       : 9,811,433 B2
APPLICATION NO.  : 14/491898
DATED            : November 7, 2017
INVENTOR(S)      : Jeong et al.

It is certified that error appears in the above-identified patent and that said Letters Patent is hereby corrected as shown below:

In the Specification

In Column 22, Line 65, delete "PTSN," and insert -- PSTN, --, therefor.

Signed and Sealed this
Nineteenth Day of June, 2018

Andrei Iancu
*Director of the United States Patent and Trademark Office*